(12) United States Patent
Demoor et al.

(10) Patent No.: US 11,507,277 B2
(45) Date of Patent: Nov. 22, 2022

(54) KEY VALUE STORE USING PROGRESS VERIFICATION

(71) Applicant: Western Digital Technologies, Inc., San Jose, CA (US)

(72) Inventors: Thomas Demoor, Ghent (BE); Carl Rene D'Halluin, Zwijnaarde (BE)

(73) Assignee: Western Digital Technologies, Inc., San Jose, CA (US)

( * ) Notice: Subject to any disclaimer, the term of this patent is extended or adjusted under 35 U.S.C. 154(b) by 555 days.

(21) Appl. No.: 16/452,254

(22) Filed: Jun. 25, 2019

(65) Prior Publication Data
US 2020/0409566 A1    Dec. 31, 2020

(51) Int. Cl.
*G06F 16/27* (2019.01)
*G06F 3/06* (2006.01)
*G06F 12/02* (2006.01)
*H04L 9/32* (2006.01)

(52) U.S. Cl.
CPC .......... *G06F 3/0614* (2013.01); *G06F 3/067* (2013.01); *G06F 3/0631* (2013.01); *G06F 12/0253* (2013.01); *G06F 16/27* (2019.01); *H04L 9/3297* (2013.01)

(58) Field of Classification Search
CPC ...... G06F 3/0614; G06F 3/0631; G06F 3/067; G06F 16/27; G06F 12/0253; H04L 9/3297
See application file for complete search history.

(56) References Cited

U.S. PATENT DOCUMENTS

| | | | |
|---|---|---|---|
| 6,505,228 B1 | 1/2003 | Schoening et al. | |
| 6,728,719 B1* | 4/2004 | Ganesh | G06F 16/2379 |
| 9,047,312 B1 | 6/2015 | Ten-Pow et al. | |
| 9,971,526 B1 | 5/2018 | Wei et al. | |
| 2005/0060609 A1 | 3/2005 | El-Batal et al. | |
| 2006/0122977 A1* | 6/2006 | Brodhun | G06F 16/288 |
| 2010/0083004 A1 | 4/2010 | Kirshenbaum | |
| 2010/0223274 A1 | 9/2010 | DeHaan et al. | |
| 2010/0235814 A1 | 9/2010 | Ohta et al. | |
| 2010/0318746 A1 | 12/2010 | Troxel et al. | |
| 2010/0333094 A1* | 12/2010 | Restall | G06F 9/5027 718/102 |
| 2013/0346986 A1* | 12/2013 | Goetz | G06F 11/3055 718/102 |
| 2014/0006458 A1* | 1/2014 | Hsieh | G06F 16/2329 707/803 |

(Continued)

OTHER PUBLICATIONS

Ma, Kun, et al., Log-based change data capture from schema-free document stores using MapReduce, IEEE Conference, Jun. 2, 2015, pp. 1-6, International Conference on Cloud Technologies and Applications (CloudTech), Marrakech, https://ieeexplore.ieee.org/document/7336969/.

*Primary Examiner* — Jensen Hu
(74) *Attorney, Agent, or Firm* — Patent Law Works LLP

(57) ABSTRACT

Example storage systems and methods provide data storage management using a key data store with progress values. A key data store includes a set of key data entries that each include a key value associated with a storage operation and a timestamp corresponding to a creation time of the key data entry. Storage management processes are executed on the set of key data entries and progress values for the storage management processes are tracked using the timestamps of the key data entries to manage the relative progress of the storage management processes.

20 Claims, 9 Drawing Sheets

(56) References Cited

U.S. PATENT DOCUMENTS

| | | | |
|---|---|---|---|
| 2014/0156618 A1* | 6/2014 | Castellano | G06F 16/2308 707/703 |
| 2015/0172412 A1* | 6/2015 | Escriva | G06F 16/182 709/202 |
| 2016/0034504 A1 | 2/2016 | Borah | |
| 2016/0191509 A1* | 6/2016 | Bestler | G06F 12/1408 713/163 |
| 2016/0308965 A1 | 10/2016 | Yamakawa | |
| 2016/0321294 A1 | 11/2016 | Wang et al. | |
| 2019/0278854 A1 | 9/2019 | Newman | |
| 2019/0334722 A1* | 10/2019 | Arasu | G06F 21/78 |
| 2020/0226115 A1* | 7/2020 | Wolfson | G06F 11/1469 |

* cited by examiner

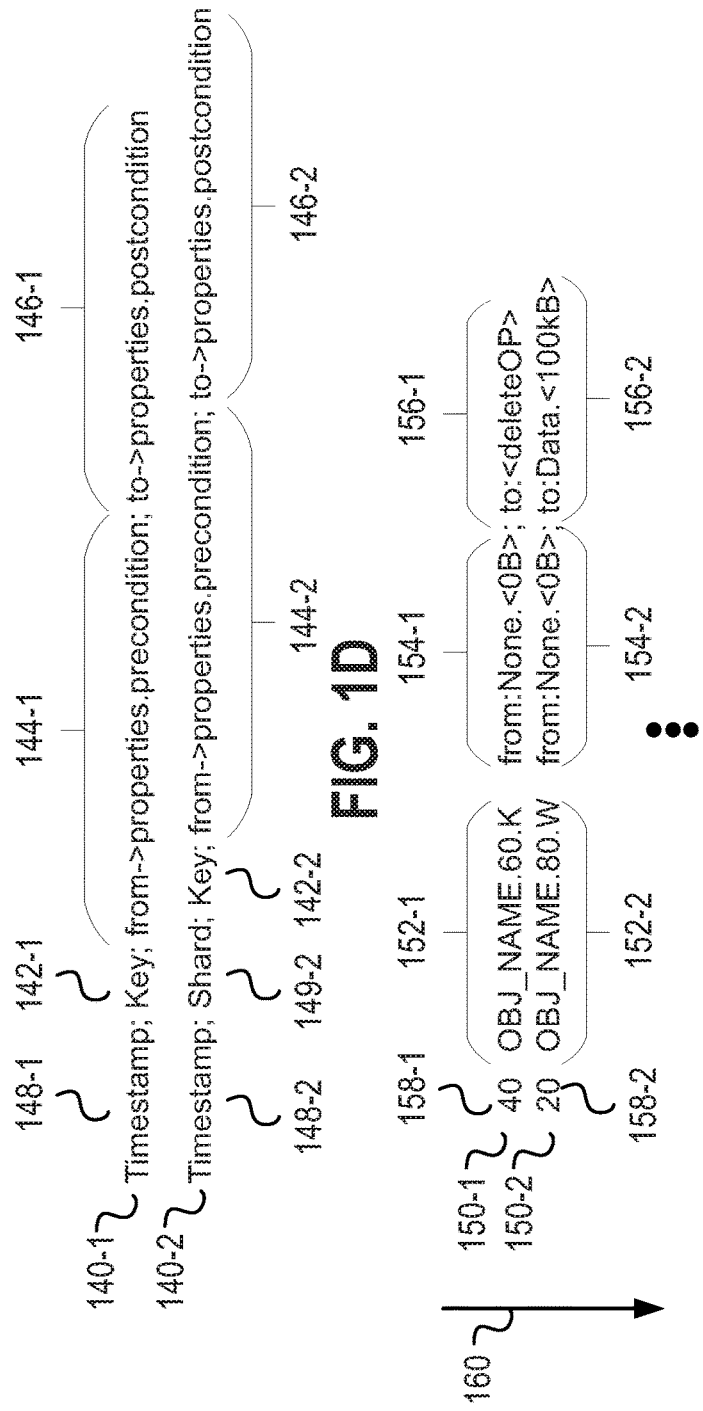

KEY VALUE STORE USING PROGRESS VERIFICATION

TECHNICAL FIELD

The present disclosure generally relates to data storage systems using a database to manage changing data property values. In a more particular non-limiting example, the present disclosure relates to using key value stores for logging data properties.

BACKGROUND

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smart phones, and tablets, allow a user to have access to a variety of useful applications nearly constantly. Using such applications results in the generation of an increasingly huge amount of data. Storing and retrieving the produced data efficiently is a significant challenge.

As the amount of data and rate of change of stored data increases, the ability to collect accurate and timely information about the stored data becomes both more important and more challenging. For example, storage system parameters, such as storage capacity, may change with every data storage transaction processed by a storage system and near real-time information on storage capacity may be desired for making storage allocation and other storage management decisions.

Some solutions use a metadata database (DB) or key value stores (KVSs) in a large-scale distributed storage system (DSS) to provide a scalable log to accommodate the current growth in data. These types of DSSs generally require that log data be maintained in the metadata DB or KVS with a minimal impact on the responsiveness of the metadata DB or KVS, including limiting the processing overhead for property logging and calculation.

There may be an ongoing need for KVS data property or operations log configurations and related processing to quickly, efficiently, and accurately maintain and update storage system parameters during the operation of DSSs. These storage system parameters may be used by the storage systems to manage configuration and storage operations on an ongoing basis.

SUMMARY

The present disclosure generally relates to a novel log configuration and related operations for data property management using progress values in a key data store to manage multiple storage management processes to provide data property calculations without the limitations of existing solutions, such as those discussed in the Background.

One innovative aspect includes a storage system, including: at least one storage node configured to execute storage operations; a key data store including a log including a set of key data entries, where each key data entry of the set of key data entries includes a key value corresponding to at least one storage operation, a timestamp corresponding to a creation time of the key data entry, and at least one processor; and a storage application executable by the at least one processor using the at least one memory to perform operations including executing a first storage management process on a plurality of key data entries from the set of key data entries in the key data store, tracking, using timestamps of key data entries forming the plurality of key data entries, a first progress value for the first storage management process, and verifying, using a second progress value for a second storage management process, at least one condition for the first storage management process, where completion of the first storage management process is based on a verification of the at least one condition for the first storage management process.

Another innovative aspect includes a computer-implemented method, including: providing a key data store including a log including a set of key data entries, where each key data entry of the set of key data entries includes a key value corresponding to at least one storage operation and a timestamp corresponding to a creation time of the key data entry; executing a first storage management process on a plurality of key data entries from the set of key data entries in the key data store; tracking, using timestamps of key data entries forming the plurality of key data entries, a first progress value for the first storage management process; and verifying, using a second progress value for a second storage management process, at least one condition for the first storage management process, where completion of the first storage management process is based on a verification of the at least one condition for the first storage management process.

Another innovative aspect includes a system, including: at least one storage node configured to execute storage operations; a key data store including a log including a set of key data entries, where each key data entry of the set of key data entries includes a key value corresponding to at least one storage operation and a creation time of the key data entry; means for executing a first storage management process on a plurality of key data entries from the set of key data entries in the key data store; means for tracking, using timestamps of key data entries forming the plurality of key data entries, a first progress value for the first storage management process; and means for verifying, using a second progress value for a second storage management process, at least one condition for the first storage management process, where completion of the first storage management process is based on a verification of the at least one condition for the first storage management process.

Implementations may include one or more of the following features, such as, but not limited to: that the key data store is sharded across a plurality of databases; that each key data entry of the set of key data entries further includes an original shard identifier; that the first storage management process is configured to operate on a first shard; that the second storage management process is configured to operate on a second shard; determining, based on the original shard identifier in at least one key data entry associated with the first storage management process, the second storage management process; querying, responsive to determining the second storage management process, for the second progress value; that each key data entry of the set of key data entries further includes an original shard timestamp; that the at least one condition includes a comparison between the original shard timestamp to the second progress value; that the at least one condition requires the second progress value to exceed the first progress value; suspending, responsive to the verification of the at least one condition for the first storage management process being unsuccessful, the first storage management process; periodically attempting to verify the at least one condition of the first storage management process; resuming, responsive to the verification of the at least one condition for the first storage management process being successful, the first storage management process; executing the second storage management process, where the first storage management process overlaps the second storage management process, and the at least one condition for the first storage management process is dependent on a progress state of the second storage management process; tracking, using the timestamps of the key data entries, the second progress value for the second storage management process; comparing the first progress value to the second progress value; determining, responsive to the second progress value exceeding the first progress value, the progress state to be met; returning, responsive to the progress state to be met, a successful verification condition; returning, responsive to the prerequisite processing not being met, an unsuccessful verification condition; that the first progress value corresponds to the timestamp of a most recently processed key data entry associated with the first storage management process; that the second progress value corresponds to the timestamp of a most recently processed key data entry associated with the second storage management process; that the first storage management process is one of calculating a storage property, replicating data objects, and garbage collection; that each key data entry of the set of key data entries further includes at least one property value includes at least one precondition value, and at least one postcondition value; and that the first storage management process calculates, based on the at least one precondition value and the at least one postcondition value, a storage property.

Other implementations may include corresponding computer systems, apparatus, computer programs recorded on one or more computer storage devices, each configured to perform actions of methods described herein, and/or other aspects. Further, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The various embodiments advantageously apply the teachings of data storage systems to improve the functionality of such computer systems. The various embodiments include operations and data structures to overcome or at least reduce issues in the previous storage systems discussed above and, accordingly, are more reliable, efficient, and scalable than other computer data storage architectures for some applications. That is, the various embodiments disclosed herein include hardware and/or software with functionality to improve the reliability and efficiency of storage system parameter calculation and reporting for automated data management decision-making. Accordingly, the embodiments disclosed herein provide various improvements to storage systems.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1C is a diagram showing an example ordered set of object key entries.

FIG. 1D is a diagram showing an example log entry for managing storage properties.

FIG. 1E is a diagram showing an example set of log entries for example storage operations.

DETAILED DESCRIPTION

The present disclosure describes a novel storage management processing technology, which may include methods, systems, apparatuses, computer program products, and other aspects, that utilizes a key data store (e.g., database, key-value store (KVS), etc.). The technology is advantageously scalable and efficient for improving distributed data storage system operations.

As a non-limiting overview, the technology can store storage properties in the key data store in a novel, ordered way that lowers overhead when processing storage operations (e.g., write requests) and determining storage system properties. The technology can include progress values to manage progress of a number of storage management processes using the key data store. The key data store supports a plurality of storage operations, such as but not limited to, put, get, delete, list, etc., and stores entries representing various data manipulation operations performed on objects, such as standard data manipulation operations (e.g., read, write, delete, modify, etc.). In some embodiments, the key data store may be sharded or distributed and the technology may include shard identifiers in the key data store to correct for timing differences in storage management processes across shards.

Figure 1A:
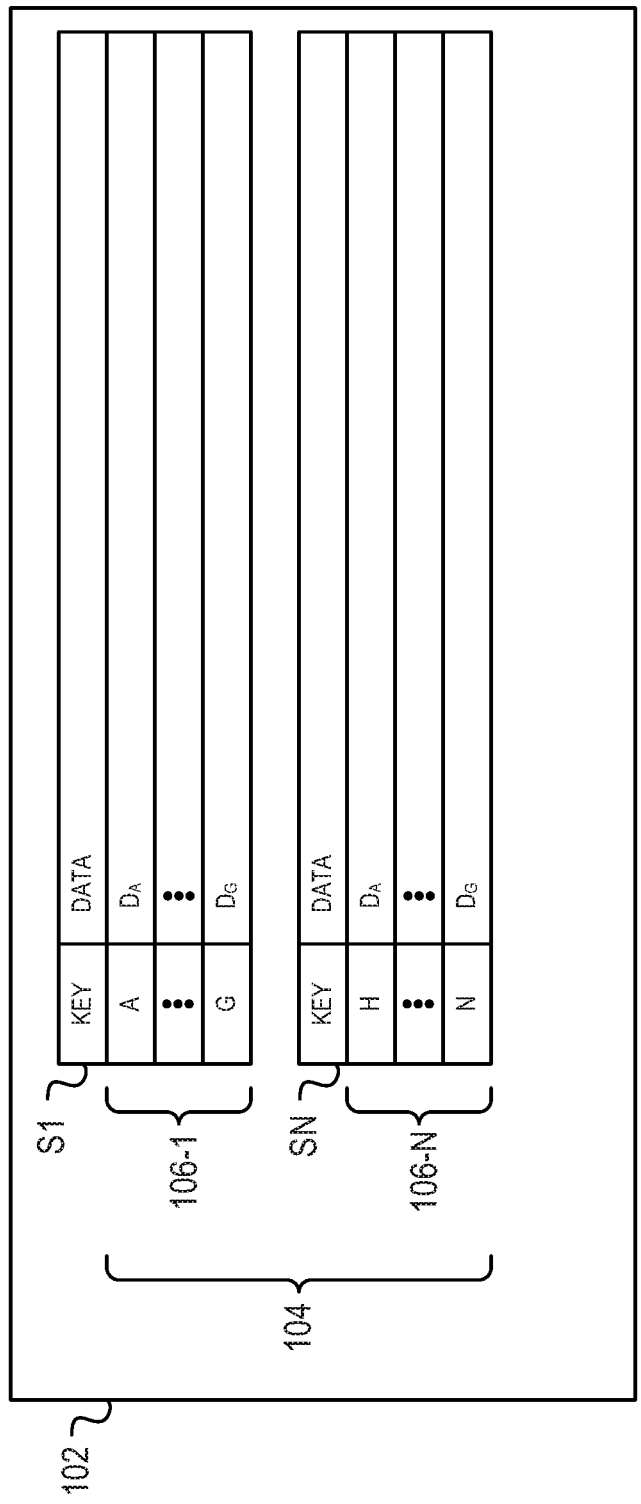
FIG. 1A is a diagram illustrating an example key data store.

FIG. 1A is a diagram illustrating an example key data store 102, which comprises a plurality of shards S1 ... SN. While two shards S1 and SN are shown, it should be understood that any suitable number of shards may be included. Each shard stores an ordered subset of object key entries. For example, shard S1 is shown as storing the subset of object key entries 106-1 (e.g., keys A-G) and shard SN is shown as storing the subset of object key entries 106-N (e.g., keys H-N). The subsets 106-1 through 106-N comprise the ordered set of object key entries 104.

Further, as shown in FIG. 1A, each key (e.g., A . . . N, etc.) can correspond to a data instance (e.g., $D_A \ldots D_N$). The data instance may comprise a pointer to a location where the actual object data is stored (e.g., in a separate database, on a physical drive, etc.), or other suitable data values. Each key may correspond to a particular object. Further, various subsets of object key entries may correspond to the same object at different points in time. In such a configuration, an ordered set of object key entries can be stored across shards that can be efficiently searched. Further, storage of the actual data may be performed in accordance with various considerations such as data location, availability, and cost.

In some embodiments, key entries 106-1, 106-N may include a log set of entries that define a log that may be traversed to determine the state of one or more data objects and their properties and/or determine one or more data storage parameters. The log may include a set of key entries corresponding to various storage operations that impact a selected property or properties. For example, each data instance (e.g., $D_A \ldots D_N$) may include precondition and postcondition values for one or more properties from which change values for the properties may be determined. In some embodiments, key data store 102 may include a plurality of concurrent logs for different properties and/or log entries interleaved with other key entries. Key data store 102 may also support multiple generations or groupings of entries over time. A generation of entries may include all entries between time points or events that designate the beginning and/or end of a generation.

Figure 1B:
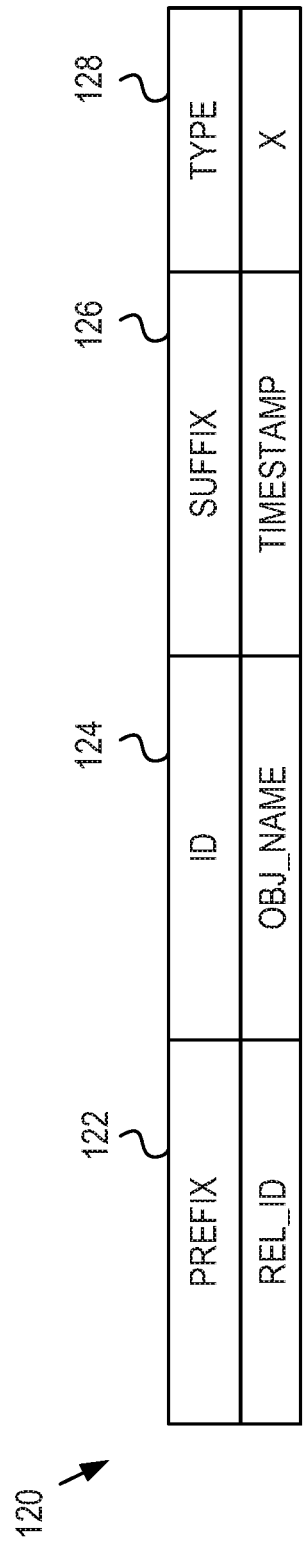
FIG. 1B is a diagram of an example object key naming structure.

In some embodiments, a key (also referred to as an object key) may be generated using an object key naming structure. FIG. 1B is a diagram of an example object key naming structure 120. As shown, a key may comprise a combination of a plurality of key components, such as, but not limited to, an object identifier and an inverse time value. More particularly, as shown, example components include a prefix 122, an object ID 124, a suffix 126, and a type 128, although it should be understood that other dimensions are possible and contemplated, and could vary based on implementation.

The prefix 122 may comprise an identifier for identifying a group of object key entries from the ordered set of object key entries that are logically related. For example, the prefix may include a domain identifier, a bucket identifier, a client identifier, or any suitable combination thereof. In this way, a given client's object keys can be grouped together. Any suitable number of prefixes may be included in an object key.

The object identifier (ID) 124 may comprise a unique identifier for the object to which the key corresponds, such as an object name. An example object identifier may comprise a unique character string (e.g., a file identifier, a file name, etc.) that is auto-generated and/or user-defined, and used for storing the object or file in an object storage, although other suitable data constructs that can uniquely identify objects are also encompassed.

The suffix 126 may comprise a ticket value for ordering different object keys associated with a particular object. The ticket value (also simply called ticket in some embodiments) may be an inverse timestamp. As discussed further herein, an inverse timestamp is calculated by determining the difference between an operation timestamp associated with the object key (e.g., local timestamp) and a reference timestamp value). As time passes, the value of the inverse timestamp generally decreases. As such, two sequential operations associated with the same object are recorded in the key data store in inverse order, with the most-recent operation being represented first (ahead of the less recent operation).

Additional suffix(es) may be appended, such as, but not limited to, an operation type, such as type 128, and/or a generation marker. The type 128 may comprise an identifier of the type of object storage operation that is represented by the object key. In some embodiments, a given operation may be denoted by a corresponding value, such as, but not limited to, unique character or character string, and the type 128 may include that value. Example object storage operations include read, write, delete, update, etc. As a further example, write and update operations may be represented by a given identifier (e.g., "W"), a delete operation may be represented a given identifier (e.g., "K"), etc., and so forth. While in some example embodiments, write and update operations may be recorded as the same type of operation, in further embodiments they may be differentiated.

FIG. 1C is a diagram showing an example ordered set of object key entries 130. As shown, the set 130 includes two keys 132-1 and 132-2 representing two sequential write operations. In this example, key 132-1 is based on an operation timestamp of 20 milliseconds (ms), the key 132-2 is based on an operation timestamp of 10 ms, and the ticketing technology uses an example reference timestamp of 100 ms. It should be understood that the timestamp values used are provided by way of example to make the examples provided herein clear, and any suitable timestamps may apply, such as a portable operating system interface (POSIX) timestamp, a 1900 date system timestamp, derivations there, and/or any other suitable convention for tracking time. Further, as a matter-of-course, the value of the reference timestamp is often chosen to have a value that is larger than the expected service life of the key data store.

Using the reference timestamp, the ticketing technology determines an inverse timestamp for each of the operations. As the operation timestamps increase with the passage of time, the computed inverse timestamps decrease for the operations executed over time. For instance, an inverse timestamp for a given operation is calculated by determining the difference between the operation timestamp and the reference timestamp). In particular, continuing the above example, for key 132-1, the inverse timestamp is 80 (100−20=80), and for write operation 132-2, the inverse timestamp is 90 (100−10=90).

By ordering the entries in the key data store (and the operations embodied thereby) relating to the same data object using at least the inverse timestamps, subsequent operations relating to that data object are arranged in entries in the ordered key data store with the most-recent operation being represented first. For instance, as shown in FIG. 1C, key 132-2, which represents an operation having an inverse timestamp of 90, is older than key 132-1, which represents a more recent operation having a timestamp of 80. As a result, an entry comprising key 132-1 is ordered ahead of an entry comprising key 132-2 in the ordered set 130 because key 132-1's inverse timestamp is lower (80 versus 90).

By way of further example, during a subsequent query, retrieval of the most-recent entry from the ordered set of object key entries (e.g., in this example, the entry comprising key 132-1) can be performed efficiently (e.g., by the key data store controller 320, see FIG. 3) because retrieval of the first entry in the ordered set for a given object (e.g., OBJ_NAME) does not require iteration through entries associated with that object. Rather, by way of illustration, such a retrieval may consume equivalent computational resources as that of an exact lookup of a single key for that object.

Versioning of an object includes the tracking and preservation of more than one version of the object as the object changes over time, and allows for the archival of the different versions of the object as they occur over time (e.g., due to modifications made over time to the object), retrieval of a prior version of the object, and/or recovery from unintended overwrites and/or deletions made to the object.

FIG. 1D is a diagram showing example log entries 140-1 and 140-2 for managing storage properties. Log entries 140 may be stored as a key entry in a key data store as described with regard to FIGS. 1A-1C. Log entries 140 may include key values 142-1 and 142-2 followed by "from" precondition fields 144-1 and 144-2 and "to" postcondition field 146-1 and 146-2 that designate a precondition value ("from") and a postcondition value ("to") in the data instance portion of the key data entry. For example, the key value may be in the form described with regard to FIG. 1B. Precondition fields 144 and postcondition fields 146 may each include a property identifier ("properties") and property value ("precondition" and "postcondition" respectively). In some embodiments, precondition fields 144 and postcondition fields 146 may each include a plurality of property identifier-value pairs for a plurality of data properties and change values associated with the data storage operation and object designated in key values 142. For example, property values for one or more of storage capacity, object size, read count, write count, or other storage properties may be included in log entries 140.

In some embodiments, log entries 140 may include timestamp values 148-1 and 148-2. For example, timestamp values 148 may include the operation timestamps used to determine the inverse timestamp in key values 142. In some embodiments, timestamp values 148 may be prepended to key values 142, be provided in their own field in log entries, or be included with a position reference or timestamp identifier within the data instance portion of the log entries. Timestamp values 148 may enable management of postprocessing progress based on the timestamp values 148 without having to reverse calculate the timestamp from the inverse timestamp within key values 142.

In some embodiments, as shown for log entry 140-2, the key data stores may be a sharded database distributed across storage locations or storage systems. Each shard of the key data stores may include its own property or operations log generated by the host storage system. Different storage systems may not have perfectly synchronized timestamps. Therefore, the ability to identify which shard or storage system a log entry originated from may be beneficial for correcting relative timing and progress of storage management processes.

A shard identifier 149-2 may be assigned to log entry 140-2 to identify the shard and/or storage system from which it originated. For example, shard identifier 149-2 may include a unique identifier or shard identifier value assigned to each shard and/or host storage system. In some embodiments, shard identifier 149 may be prepended to key values 142, be provided in their own field in log entries, or be included with a position reference or timestamp identifier within the data instance portion of the log entries. In some embodiments, a shard reference or lookup table for shard identifiers may be accessible to storage applications.

FIG. 1E is a diagram showing an example set of log entries 150 for example storage operations. As shown, the set 160 includes two key data entries 150-1 and 150-2 representing two sequential storage operations, write operations to the same data object ("OBJ_NAME"). Key data entries 150 may include key values 152-1 and 152-2 as described above with regard to FIG. 1B. The corresponding data instances may include precondition fields 154-1 and 154-2 and postcondition fields 156-1 and 156-2. Key data entries 150 may also include timestamp values 158-1 and 158-2 as described above with regard to FIG. 1D.

In the example shown, a write operation occurred at timestamp 20 ms (timestamp value 158-2), resulting in an inverse timestamp of 80 ms. Precondition field 154-2 included no properties ("None") and a property value of 0 bytes. Postcondition field 156-2 resulting from the write operation is a data object size ("data") property with a property value of 100 kilobytes (kB). A delete operation occurred at timestamp 40 ms (timestamp value 158-1), resulting in an inverse timestamp of 60 ms. The delete operation starts with a precondition value of no properties ("None") and a property value of 0 bytes. The postcondition value is an operation flag for delete operations ("<deleteOP>").

Figure 1F:
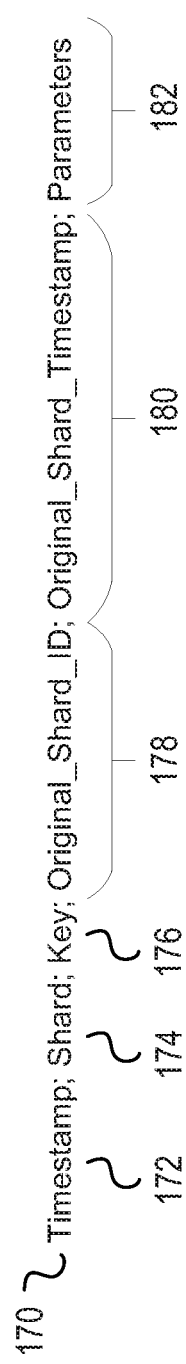
FIG. 1F is a diagram showing an example log entry for example storage operations.

FIG. 1F is a diagram showing an example log entry 170 for example storage operations configured to track log entries when they are migrated between shards. As shown, log entry 170 may represent a single storage operation. Log entry 170 may include a timestamp 172 (such as the timestamp of when the entry was created), a shard identifier 174 (such as the shard identifier of the shard in which it is presently stored), and a key value 176, as described with regard to the FIGS. 1A-1E.

Log entry 170 may also include original shard identifier 178 and original shard timestamp 180. For example, original shard identifier 178 may include a unique identifier or shard identifier value assigned to the shard database and/or host storage system where the storage operation and/or log entry originated. Similarly, original shard timestamp 180 may include the local timestamp of the original storage operation and/or log entry where it originated. Original shard identifier 178 and original shard timestamp 180 may enable an accurate record of where and when the log entry originated that is maintained as the log entry is managed across sharded logs, such that the information is maintained in log entry metadata even when the log entry is migrated or replicated. In some embodiments, original shard identifier 178 and/or original shard timestamp 180 may be appended to key value 176, be provided in their own field in log entry 170, or be included with a position reference or other identifier within the data instance portion of log entry 170. In some embodiments, a shard reference or lookup table for shard identifiers may be accessible to storage applications.

As described above, log entry 170 may include other parameters 182 in the data instance portion of log entry 170. For example, the corresponding data instance may include precondition fields and postcondition fields for one or more storage parameters.

Figure 2:
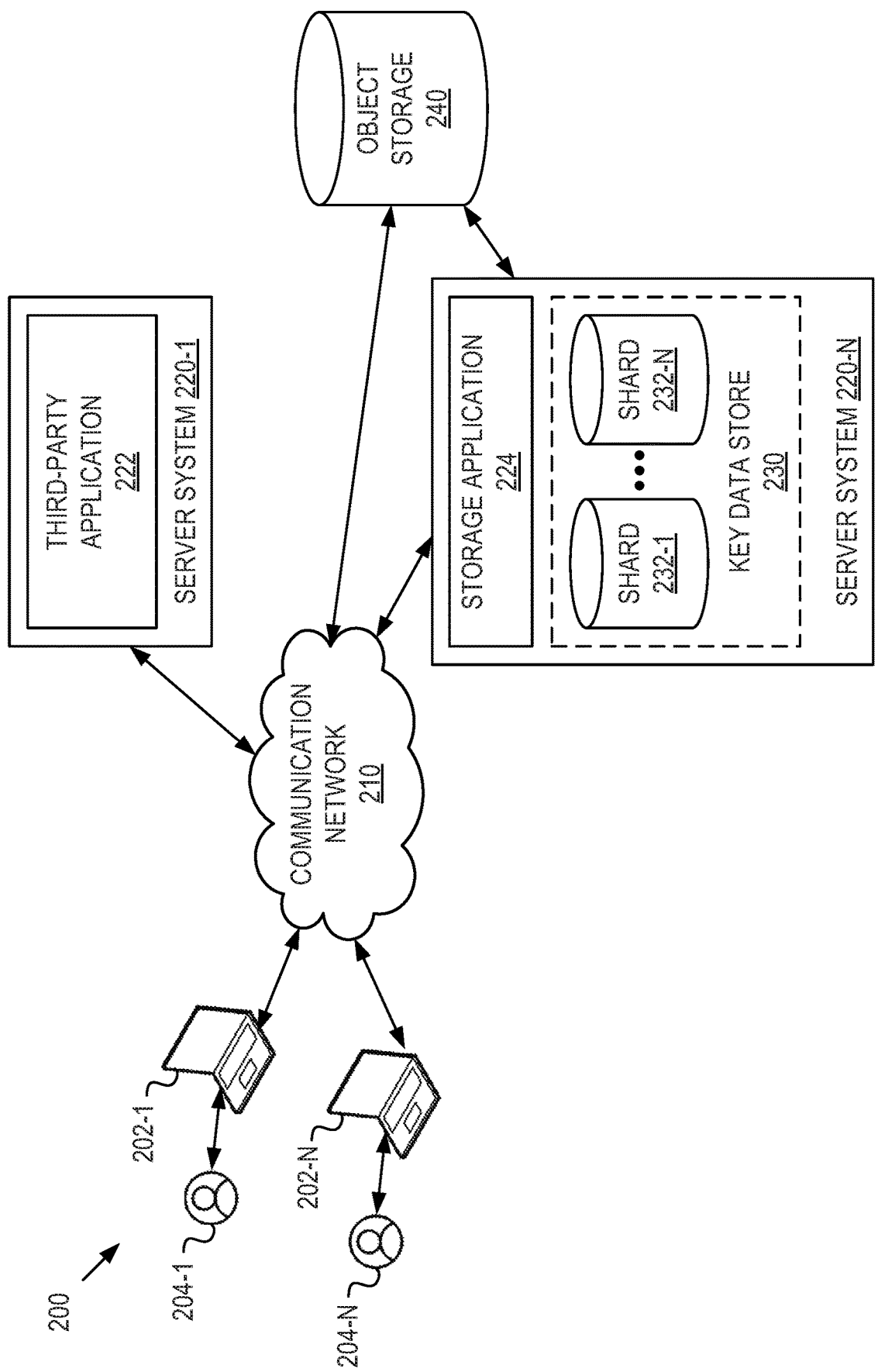
FIG. 2 is a block diagram of an example distributed storage system.

The key data store may be implemented in a distributed environment, such as the distributed storage system 200 depicted in FIG. 2. As shown, the system 200 can include client systems (e.g., client systems 202-1 and 202-N), server systems (e.g., server systems 220-1 and 220-N), a key data store 230, and an object storage 240. These components 202, 220, 230, and/or 240 may be interconnected via a communication network 210. For simplicity in some cases, depending on context, the client systems 202-1 and 202-N may also be referred to herein individually or collectively as client system 202 or client 202, and the server systems 220-1 and 220-N may be referred to herein individually or collectively as server system 220 or server 220.

The communication network 210 may include any number of private and public computer networks. The communication network 210 include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 210 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (short messing service (SMS), multimedia messing service (MMS), internet message access protocol (IMAP), simple mail transfer protocol (SMTP), post office protocol (POP), web distributed authoring and versioning (WebDAV), etc.), or other suitable protocols.

A client system may comprise an electronic computing device, such as a personal computer (PC), a laptop, a smartphone, a tablet, a mobile phone, a wearable electronic device, server, server appliance, or any other electronic device or computing system capable of communication with the communication network 210. The client system 202 may store one or more client applications in non-transitory memory. A client application may be executable by a computer processor of the client system 202. In some example embodiments, a client application includes one or more applications such as, but not limited to, data storage applications, search applications, communication applications, productivity applications, game applications, word processing applications, or any other useful applications. A client application may include a web browser and/or code executable thereby in some cases. In some embodiments, a client system 202 may include an application for creating, modifying, and deleting objects, which may be stored in the object storage 240. For instance, the application may be specifically customized for communication with the third-party application 222 and/or storage application 224, such as an application adapted to configure and/or utilize programming interfaces of the storage application 224. In some embodiments, the third-party application(s) 222 hosted by the server system 220-1 may embody a client of the storage application 224, as it may access the functions of the storage application 224 using various programmatic interfaces surfaced thereby (e.g., to create, store, retrieve, delete, etc., objects stored in the object storage).

The client systems 202 and/or server systems 220 may send/receive requests and/or send/receive responses, such as but not limited to HTTPS requests/responses, to/from one another. A client system 202 may present information, such as visual, audio, tactile, and/or other information via output devices, such as displays, audio reproduction devices, vibration mechanism, etc., based on information generated by client system 202 and/or received from a server system 220.

Users may interact with various client systems 202 to provide input and receive information. For instance, as illustrated, users 204-1 and 204-N may interact with client systems 202-1 and 202-N by utilizing the operating system and/or various applications executing on the client systems 202-1 and 202-N.

In some embodiments, a client application (e.g., a client application executing on a client system 202, the third-party application 222, etc.) may send a request (also referred to as an object storage request) to the server system 220 to store, update, delete, or retrieve a particular file stored at the server system 220-N through the communication network 210. For example, a user 204 may update a document using a word processing application and may save the updated version to the server system 220-N, in which case the word processing application transmit a request to the storage application 224 to store the updates.

The object storage request may include information describing the object being updated, such as a file name, the data comprising the updates, a client identifier, an operation type, etc., and the storage application 224 may use that information to record the updates, as described herein. In another example, a client application (e.g., an application executing on a client system 202, the third-party application 222, etc.) may request an object or portion thereof, a list of objects matching certain criteria, etc., in which case the request may include corresponding information (e.g., an object identifier, search criteria (e.g., time/date, keywords, etc.), and receive an object list or the object itself from the storage application 224. Numerous other use cases are also applicable and contemplated.

As shown in FIG. 2, the server system 220-N may include a storage application 224 and may be coupled to and/or include a key data store 230. The storage application 224 may include components that perform various tasks, as discussed with reference to at least FIG. 3. The storage applications 224, and/or its components, may be coupled for communication to one another and other components of the system, such as the key data store 230, the object storage 240, an application executing on a client system 202, the third-party application 222, etc.

The storage application 224 may provide an object storage service, manage data storage using the key data store 230 and the object storage 240 (e.g., store, retrieve, and/or other manipulate data in the key data store 230, retrieve data objects from the object storage 240, etc.), process requests received from various entities (e.g., client systems 202, server systems 220, local application, etc.), provide for lock-free concurrency, perform garbage collection, and perform other acts, as discussed further herein. The storage application 224 may include various interfaces, such software and/or hardware interfaces (e.g., application programming interface(s) (API(s)), that may be accessed (e.g., locally, remotely, etc.) by components of the system 200, such as various client applications, the third-party application 222, etc.

In some embodiments, the storage application 224 may be a distributed application that is implemented in two or more computing systems. In some embodiments, the object storage 240 may comprise a plurality of storage devices, servers, software applications, and other components, such as but not limited to any suitable enterprise data grade storage hardware and software. Similarly, while FIG. 2 shows the key data store 230 as residing on a single server, it should be understood that the key data store 230 may be distributed across two or more computing systems, such as server systems 220. In some embodiments, the storage application 224 may be a local application receiving local and/or remote storage requests from other clients (e.g., local applications, remote applications, etc.).

The key data store 230 may comprise a database that stores an ordered set of object key entries, as discussed in further detail elsewhere herein. In some embodiments, the key data store 230 may comprise a horizontally partitioned database having two or more shards 232-1 . . . 232-N, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Thus, depending on the configuration, database shards may be implemented on different physical storage devices, as virtual partitions on the same physical storage device, or as any combination thereof.

The key data store 230 may store and manage one or more operation logs 310-1 . . . 310-N (also individually or collectively simply 310). The operation logs 310-2 . . . 310-N may correspond to and be respectively associated with the shards 232-1 . . . 232-N, although other suitable variations are also possible or contemplated (e.g., master log, combined logs, individual logs, a combination of the forgoing, etc.).

The server system 220-N may be coupled to and/or include an object storage 240. The object storage 240 comprises one or more data stores for storing data objects. The object store 240 may implemented across a plurality of physical storage devices. In some example embodiments, the plurality of physical storage devices may be located at disparate locations. Objects stored in the object storage 240 may be referenced by object key entries stored in the key data store 230. In some example embodiments, multiple copies of a given object or portions thereof (e.g., erasure-encoded copies) can be stored at different physical storage devices to protect against data loss through system failure or to have the object quickly accessible from different geographic locations.

The key data store 230 and/or the object storage 240 may be included in the server system 220-N or in another computing system and/or storage system distinct from but coupled to or accessible by the server system 220-N. The key data store 230 and/or the object storage 240 include one or more non-transitory computer-readable mediums (e.g., such as those discussed with reference to the memor(ies) 304 in FIG. 3) for storing the data. In some implementations, the key data store 230 and/or the object storage 240 may be incorporated with the memor(ies) 304 or may be distinct therefrom. In some implementations, key data store 230 and/or the object storage 240 may store data associated with a database management system (DBMS), such as one comprised by and/or controlled by the storage application 224 (e.g., the key data store controller 320, the storage service 322, etc., see FIG. 3) and/or other components of the system 200. In some instances, the DBMS may store data in multi-dimensional tables comprised of rows and columns, and manipulate, e.g., insert, query, update and/or delete, rows of data using programmatic operations, although other suitable DBMS configurations are also applicable.

It should be understood that the system 200 illustrated in FIG. 2 is representative of an example system, and that a variety of different system environments and configurations are contemplated and are within the scope of the present disclosure. For instance, in some further embodiments, various functionality may be moved between servers, from a server to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 200 may be integrated into a single computing device or system or additional computing devices or systems, etc.

Figure 3:
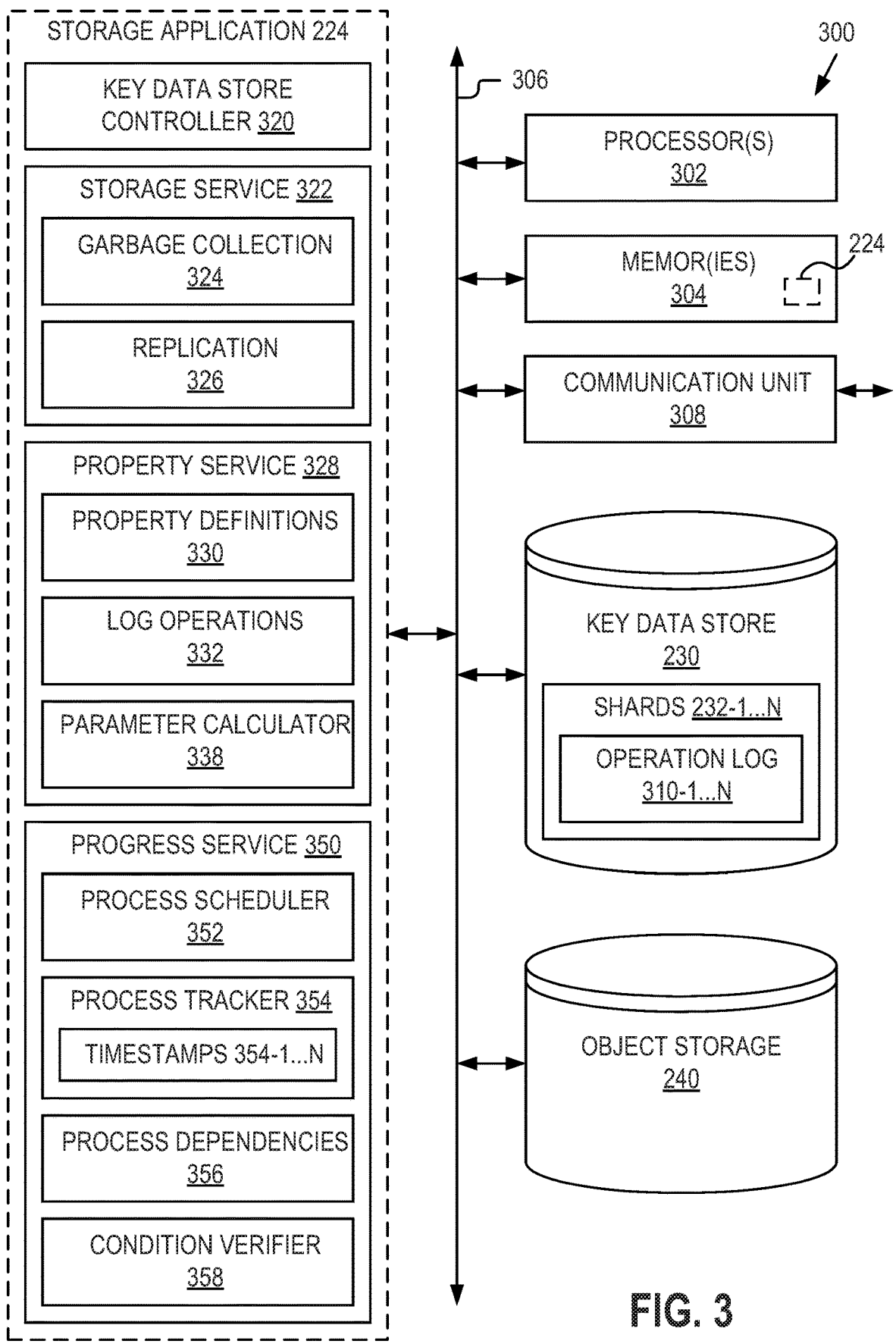
FIG. 3 is a block diagram of an example computing system.

FIG. 3 is a block diagram of an example computing system 300. In some embodiments, computing system 300 may represent a server instance or collection of instances, such as server system 220-N. In some embodiments, computing system 300 may reflect other computing systems, such as a client system 202, a dedicated storage system, etc. Computing system 300 may comprise and/or be coupled to one or more processors 302, one or more memories 304, one or more communication units 308, a key data store 230, and an object storage 240. Computing system 300 further includes an instance of storage application 224. The components of computing system 300 can be communicatively coupled by a bus 306. In some embodiments, key data store 230 and/or object storage 240 may be implemented in a separate computing system and may be coupled to computing system 300 via communication unit 308. In such embodiments, storage application 224, or aspects thereof, may be implemented in the separate computing system (e.g., as a distributed or local application, etc.)

As shown in FIG. 3, storage application 224 includes a key data store controller 320, storage service 322, property service 328, and progress service 350, although it should be understood that the depicted storage application 224 architecture is provided by way of illustration, and that storage application 224 may include other components and/or include other component hierarchies, and/or that the foregoing components and/or their acts and/or functionality may be combined or segmented into further components, etc.

Storage application 224, and/or its sub-components, such as, but not limited to, key data store controller 320, storage service 322, property service 328, and/or progress service 350 may be implemented in hardware and/or software. For instance, storage application 224, and/or one or more of its sub-components, may include hardware and/or software logic executable by the computing system 300. In some embodiments, storage application 224, and/or one or more of its sub-components, may comprise sets of instructions executable by processor(s) 302 to provide their functionality. In some embodiments, storage application 224, and/or one or more of its sub-components, are stored in memor(ies) 304 of computing system 300 and are accessible and executable by processor(s) 302 to provide their functionality. In any of the foregoing implementations, storage application 224, and/or one or more of its sub-components, may be adapted for cooperation and communication with processor(s) 302 and other components of computing system 300.

In further implementations, storage application 224, and/or one or more of its sub-components, may include specially configured software stored in memor(ies) 304 and executable by processor(s) 302 so as to configure processor(s) 302. In some embodiments, storage application 224, and/or one or more of its sub-components, may include logic gates, switches, application specific integrated circuitry (ASIC), a programmable logic controller, an embedded microcontroller, and/or other suitable hardware, etc. In further embodiments, storage application 224, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

Key data store controller 320 comprises logic executable to manage the key data store 230. For instance, the key data store controller 320 maintains the integrity of the ordered set of object key entries, generates new object keys, stores new entries, retrieves existing entries, and manages concurrency, etc.

Key data store controller 320 can maintain the entries stored in the key data store 230 as an ordered set of object key entries. As discussed elsewhere herein, such as with reference to FIGS. 1A-1F, the ordered set of object key entries may first group the entries using at least an object identifier component of the key, and then group the entries corresponding to each name in order of most-recent to least recent using an inverse time component of each of the keys. Additionally, entries may further be grouped in the ordered set of object key entries using further key components, such as one or more additional prefixes preceding the object name/identifier. One or more suffixes following the inverse timestamp component may be used to determine characteristics about the operation represented by the entry and/or further distinguish the key from other keys, for instance based on the application or device that executed the operation (e.g., client ID), the type of operation that was performed, and so forth.

In some example embodiments, keys may comprise alphanumeric character strings that include letters, numbers, and/or symbols (character symbols, punctuation, mathematical symbols, etc.), in which case the ordered set of object key entries may be sorted alphanumerically. For instance, referring to FIG. 1C, key 132-1 is first because the inverse timestamp of 80 comprising a portion of the character string of that key is lower than the inverse timestamp of 90 comprising a portion of the character string of the subsequent key of entry 132-2. However, it should be understood that configurations that reverse the sorting order and the inverse timestamps to achieve an objective equivalent to that as the ordered set of object key entries are encompassed hereby. Further, the keys may comprise other suitable constructs (e.g., encoded, compressed, etc.) that can be sorted in an analogous manner.

Key data store controller 320 stores entries in the key data store 230 reflecting data manipulation or storage operations performed on objects (e.g., read, modify, write, etc.). In some embodiments, storage operations performed on object may include or trigger changes in one or more object properties, such as object size, and the entries in key data store 230 may include storage property values, including precondition values and postcondition values. Entries storing property change values may define a log set of key entries for one or more properties, objects, or other logical grouping of log entries. Entries may be stored responsive to object storage requests received by the storage service 322, such as but not limited to, put, get, delete, list, etc. Storage service 322 may be coupled to key data store controller 320 to instruct the key data store controller 320 to record the data storage operations. For example and not limitation, in a software embodiment, storage service 322 can call corresponding methods of key data store controller 320 configured to perform the various functions and acts described herein. An instruction received form storage service 322 may comprise a new key entry request that includes components for generating the key, and in some embodiments, data corresponding to the key and/or properties related to the storage operation and/or data object.

By way of example, when recording a write, update, delete, etc., operation, the key entry request received from storage service 322 may include key-related data for generating the key, and a corresponding data instance (e.g., data value) for storage in association with the key. Responsive to receiving the storage instruction from storage service 322, key data store controller 320 computes an inverse timestamp using the key-related data, generates the key using the inverse timestamp, the object identifier, etc. (e.g., a prefix, an operation type, etc.), and stores a new entry comprising the generated key and the data instance in order of recency, as described elsewhere herein. In some embodiments, the data value may include precondition and postcondition values for one or more storage properties.

Continuing the foregoing example, key data store controller 320 can determine the inverse timestamp using an operation timestamp and a reference timestamp by determining a difference between the operation timestamp and the reference timestamp (e.g., subtracting the operation timestamp from the reference timestamp), as discussed elsewhere herein. The operation timestamp may be included in the instruction data or may be determined by key data store controller 320 (e.g., using a clock of the local system, issuing a call to the operating system, etc.). For instance, the object storage request received and processed by storage service 322 includes a timestamp determined by the requesting computing system upon which the request was initiated (e.g., a client system 202, server system 220-1, etc.). In this case, the local operation timestamp may reflect the point in time in which the object storage operation was initiated (e.g., based on a clock of that system). In another example, key data store controller 320 assigns a timestamp to a requested object storage request based on the clock at server system 220. Other suitable variations may also apply.

In the foregoing example, the new entry is situated first for that object (relative to other existing entries) in the ordered set of object key entries since it is the most recent based on the inverse timestamp. However, as further operations are performed on the object, as discussed elsewhere herein, corresponding further entries are added to key data store 230 and the foregoing new entry becomes less recent. This advantageously allows for scalable and flexible versioning of a data object.

An operation type component included in the key generated by key data store controller 320 may reflect the operation performed on the object, and may be used to record the lifecycle of the object over time (when it was initially created, modified, deleted, etc.).

As another example, when performing a read operation (e.g., responsive to receipt of a list request), the instruction data received from storage service 322 may include key-related search terms that are used for querying key data store 230. For example, the search term(s) may comprise an object identifier or portion thereof, and key data store controller 320 may query the ordered set of object key entries in key data store 230 based on it and return a corresponding result set. Additional or alternative search term(s) may include, but are not limited to, data describing a domain, bucket, timestamp, operation type, etc., and key data store controller 320 may query the ordered set of object key entries in key data store 230 based on them and return a corresponding result set.

In some cases, the result set may be ordered in inverse order beginning with the most-recent entry first and the oldest entry last, which mirrors the order in the ordered set of object key entries of key data store 230, although the result set could be ordered in other ways depending on implementation.

In some embodiments, further key components may be included in the instruction from storage service 322 so the result set may be refined (e.g., limited to a certain client and/or operation type, etc.). In some cases, the most-recent entry for a particular object reflecting the most-recent data manipulation operation may be requested, in which case the result set may include a single result. Other variations are also possible and contemplated.

Storage service 322 comprises computer logic executable to process object storage requests. Storage service 322 may receive requests from local applications and/or remote applications. An application that sends storage requests to storage application 224 is referred to herein as a client application. Storage service 322 can process the requests and transmit corresponding responses, which may include confirmation data confirming a successful execution of a storage operation, response data reflect results of a query-based request, and/or error information reflecting any errors that were encountered, etc. In further embodiments, the functionality of storage service 322 may be included in key data store controller 320, in which case key data store controller 320 may receive and process the object storage requests.

In some embodiments, storage service 322 may include a request handler that receives and parses object storage requests from client applications, such as a client application operating on various client systems 202, server systems 220, etc. As discussed elsewhere herein, the request may include any data necessary for executing the request, such as data for generating a new object key entry (e.g., key components, data value (e.g., an address, such as a link, pointer, reference, unique identifier, etc.)), data for querying entries based on the key (e.g., search terms, key components, etc.), object data to be stored in the object storage 240 (e.g., comprising a new object, modification to the object, object metadata describing the object, updates, etc.), one or more property types and property values, including precondition and postcondition values, etc. Storage service 322 may parse the data from the request and process it accordingly.

For example, responsive to receiving a request, the storage service may implement the requested object storage operations in object storage 240. For example, storage service 322 may read, write, update, and/or otherwise manipulate objects in object storage 240 based on parameters of the request. For instance, if the request is a write request that stores a new object to object storage 240, storage service 322 may write the new object to object storage 240.

Storage service 322 may interact with the key data store controller 320 to store and retrieve data from key data store 230. To do so, in some cases, storage service 322 can issue various instructions to key data store controller 320, such as but not limited to instructions comprising put, get, delete, list, request, etc.

In some embodiments, in conjunction with the implementation of an object storage operation, storage service 322 may request that key data store controller 320 store a new entry reflecting the operation responsive to receiving the object storage request from a client. As discussed elsewhere herein, each ticket/entry stored in key data store 230 may be associated with an object storage operation performed at a particular point in time in association with an object in object storage 240.

By way of further example and not limitation, storage service 322 may request that key data store controller 320 store an entry in key data store 320 that corresponds with an operation being performed on a corresponding object in object storage 240. For instance, in association with writing a new object to object storage 240, storage service 322 may request that key data store controller 320 store a new entry comprising a corresponding object key (that includes the object identifier, inverse timestamp, etc.) and object reference in key data store 230. Alternatively, when an object is deleted from object storage 240, storage service 322 can request that key data store controller 320 store an entry in key data store 230 reflecting deletion of that object, as discussed elsewhere herein. In association with that instruction, storage service 322 may or may not delete some or all instances of the object data from object storage 240 depending on the data retention protocol.

In some embodiments, storage service 322 may manage garbage collection 324 as a storage management process. Garbage collection may include any process for reclaiming memory or storage allocations related to data objects no longer active in the DSS. For example, storage service 322 may initiate garbage collection 324 in response to data objects being deleted or moved, at regular intervals or activity thresholds, and/or in response to input or trigger conditions from other functions, such as property service 328. Garbage collection 324 may enable object storage 240 and/or key data store 230 to reuse storage or memory space for active and future data objects, as well as optimizing the storage locations of data objects and related data units, such as by defragmenting. After garbage collection is run, logical and/or physical data units may be returned to available storage capacity and may impact data properties and storage system parameters. In some embodiments, garbage collection 324 may systematically process log entries in operation log 310 and progress through operation log 310 may be indexed by timestamp values and/or key values including timestamp values or inverse timestamp values.

In some embodiments, storage service 322 may manage replication 326 as a storage management process. Replication may include any process for duplicating one or more data objects and/or related metadata to another storage location, such as another storage node or physical device within the DSS. Storage service 322 may initiate replication 326 in response to data objects being migrated, as part of a data redundancy configuration, and/or in response to input or trigger conditions from other functions. Replication 326 may include a process for systematically reading one or more data objects from one storage location and writing those data objects to another location. A new set of metadata may be created in the new storage location to reflect the replicated data objects. Replication 326 may include a process for systematically reading one or more metadata stores and/or related data structures in one storage location and writing a copy of some or all key data entries in another metadata store in another storage location. In some embodiments, replication 326 may systematically process log entries in operation log 310 and progress through operation log 310 may be indexed by timestamp values and/or key values including timestamp values or inverse timestamp values. For example, the timestamp value of the most recently processed key data entry may be used to identify and record the progress of the storage management process.

In some embodiments, storage service 322 may manage any number of additional storage management processes that use operation log 310 and/or metadata entries in key data store 230 to track progress. For example, storage service 322 may include data scans, data migration, metadata sharding, storage defragmentation, data scrubs, data recovery, etc. Any of these storage management processes may operate on and/or generate log entries in operation log 310.

In some embodiments, the storage service may instruct key data store controller 320 to query key data store 230 for one or more entries matching query criteria included in the request. For instance, responsive to receiving the request, key data store controller 320 may query the operations associated with a particular object by querying key data store 230 for the ordered keys associated with the object (e.g., using the object identifier, etc.), and return a result set to storage service 322 for provision to the requester. Storage service 322 may be coupled to key data store controller 320, and interact with key data store controller 320 to store and retrieve data from key data store 230.

Property service 328 comprises logic executable to manage an operation log 310 in key data store 230. For instance, property service 328 manages the properties monitored in operation log 310, maintains the integrity of the log set of key data entries, generates or defines property fields for a given storage operation, stores new entries, retrieves existing entries, calculates storage parameters from the log, reports storage parameters to storage management functions, and manages log operations, such as cleanup, etc. Property service 328 may identify and manage multiple generations of key data entries in operation log 310, such as distinguishing an active generation of log entries from a base or prior set of log entries. For example, generation 312-1 may be a base generation of key data entries that was present in operation log 310 prior to an initialization or other event and generation 312-2 may be an active generation of key data entries distinguished by a generation marker. In some embodiments, any number of generations 312-N may be identified and managed based on generation markers inserted into each log entry, such as by appending to the key value.

Property service 328 may be coupled to key data store controller 320, and interact with key data store controller 320 to store and retrieve data from operation log 310 in key data store 230. Property service 328 may be coupled to storage service 322, and interact with storage service 322 to determine properties and property values corresponding to each storage operation processed by storage service 322. In some embodiments, property service 328 may include property definitions 330, log operations 332, and parameter calculator 338.

Property definitions 330 may include one or more data structures for defining storage properties to be stored in operation log 310. For example, property definitions 330 may include a definition file for data object size, defining a property identifier (e.g. "data"), property value type (e.g. integer), and the metadata field(s) and/or related calculations from which the value may be determined for any given storage operation. In some embodiments, a single property may be defined for operation log 310, while others may include a plurality of property definitions to track a plurality of storage properties in one or more logs. Other storage properties may include, but are not limited to, total storage capacity, write count, read count, error/retry count, and other performance parameters for the data object and/or related storage systems or applications calling the data object.

Log operations 332 may manage the maintenance and integrity of log entries in operation log 310. For example, log operations 332 may include a plurality of functions or key data operations for adding and removing log entries in response to storage operations and/or related log maintenance operations. In some embodiments, log operations 332 may include basic log operations, like log, cleanup, removal, and logical delete functions. Other log maintenance functions may be included in some embodiments.

A log operation may write or store key data entries including one or more precondition fields and postcondition fields in operation log 310. For example, a write operation "W" for a data object "A" at a first time value "20" may result in a key "A_80_W", 80 being an inverse time value as described above. A subsequent write operation at a second time value "25" for this object will for example result in a corresponding key "A_75_W". A subsequent delete operation "K" at a third time value "30" will for example result in a key "A_70_K". The key data entries in operation log 310 may be added in an ordered way based on these keys to result in the most recent key entry always appearing first, thereby allowing for an efficient retrieval of the most up to date state/operation of the data object in the DSS.

An exemplary write operation, and the corresponding log-based key scheme, will now be described. In the embodiment described below, property "total_storage_capacity" is considered to be 0 (when starting with an empty system) or the correct value for the current system. Such a write operation could, for example, be made available through an API, similar to the Amazon simple storage solution (S3) API PUT operation handled by storage service 322.

When now writing 100 kB data object "A" at time "20" to the DSS comprising as contents "Data", the log will be checked for an existing entry for object A. When there is no existing entry present in the log for data object "A", the following entry will be added to the log: A_80_W; from: None.<0B>, to: Data.<100 kB>. Thus, a first log key data entry operation for a given data object may generate a null or default start value for the relevant property, such as 0B for an empty (or previously non-existent) object.

For example, upon addition of this entry to the log, a process can immediately be triggered (as described below with regard to parameter calculator 338) to adjust the "total storage capacity" by means of both the precondition and the post condition property for the storage capacity of object A. As described, as there was no pre-existing entry in the log for object A, the precondition property was set to 0B. The postcondition property was set to 100 kB, equaling the size of the written data. In this way the "total storage capacity" may be incremented by the change value (post condition property−precondition property=100 kB). The combination of the key scheme and both the precondition and postcondition properties may ensure that the "total storage capacity" can be incremented correctly, and only once for each operation.

Cleanup and removal operations may handle delete and similar data change storage operations that mark a data object for garbage collection. For example, a cleanup operation may be embodied in a cleanup key data entry operation executed by property service 328 to remove prior key data entries for the target data object that are no longer needed. A removal operation may be embodied in a removal key data entry operation executed by property service 328 to update or generate an updated log entry that represents the change in the storage property responsive to the data change event.

To continue the example above, data object A may be deleted at time 40. Log operations 332 may trigger three related log operations. First, a log operation may add a key data entry to operation log 310: A_60_K; from: None.<0B>; to:<deleteOP>. Note that delete operations may be treated as a new entry with a precondition parameter of None and value of 0B. Storage service 322 may immediately render the data object invisible to the user, but log operations 332 may not immediately modify related parameter calculations. Object A may be marked for garbage collection by storage service 322 and a cleanup operation may initiate an operation to wait for the garbage collection process to complete and cleanup or remove prior entries related to object A. A total storage capacity calculation during this process may still result in the 100 kB of object A being treated as used until garbage collection completes.

In response to garbage collection for object A completing, a removal operation may execute a log operation that negates the prior write operation so it can be deleted from the key data entries. For example, a log operation of A 80 W; from: Data.<100 kB>; to: None.<0B> may remove the original A_80 W entry and correct subsequent total storage capacity calculations back to 0B. A reliable update of the total storage capacity may be assured by means of the log-based operations for the specific key scheme. By waiting for the cleanup of the original data object and responsively negating it with a log operation with appropriate precondition and postcondition values, the pointer to the data object may not be removed from the metadata key database before the related data object is removed from the backend DSS (e.g. object storage 240).

The foregoing process may protect against mishandling of multiple delete operations, which may occur in DSS. For example, two users may issue delete operations for data object A at times 40 and 41. As described above, the initial write would be logged at A_80 W and the first delete would be logged at A_60_K. The second delete would be logged as: A_59_K; from: None.<0B>; to:<deleteOP>. Storage service 322 rendering the data object invisible for users and marking object A for garbage collection is not impacted by multiple instances. The cleanup operation may similarly wait for garbage collection for the object to complete, which will only occur once, and the removal operation will only execute once in response. Thus, the single removal operation will only decrement the storage capacity once and accuracy of the property values is maintained. The end result may be total storage capacity of 0B and only the delete key data entries remaining in the key database.

In some embodiments, the foregoing process may also protect against multiple and conflicting write operations, such as write operations for the same object received from two different users. For example, the previously described write operation on object A at A_80_W may be followed by a second write from a different client at 30 ms and logged as: A_70_W; from: None.<0B>, to: NewData.<250 kB>. Upon processing the second write request, storage service 322 may identify the conflicting requests and resolve it in accordance with the conflict resolution policy of the DSS. Upon identifying which write request will be rejected, a garbage collection process may trigger cleanup and removal operations as described above. For example, upon entry of the key A_70_W to the metadata, the presence of older key A_80_W may be detected and identified for removal using cleanup and removal operations.

In some embodiments, a logical delete operation may provide an additional function to assist with the lag between logging a delete operation and waiting for garbage collection to trigger cleanup and removal. Logical delete operations may add an operation in response to delete and similar storage operations that inserts a logical delete flag or marker into the log entry for the prior write of the object. The logical delete flag may include a value appended to the postcondition value, precondition value, or otherwise inserted into the data portion of the log entry. For example, logical delete may read the prior write operation entry for the data object, such as A_80_W, and generate a logical delete key data entry that inserts a logical delete marker value, such as "|LD", in the postcondition value of the entry, resulting in: A_80_W; from: Data.<100 kB>; to: Data.<100 kB|LD>. Cleanup and removal operations may operate as described above in executing the cleanup key data entry operation and removal key data entry operation (e.g. A_80_W; from: Data.<100 kB|LD>, to: None.<0B>). Parameter calculator 338 may immediately adjust the relevant storage parameter(s) based on the logical delete marker without waiting for completion of cleanup and removal.

Parameter calculator 338 may include one or more functions that allow property service 328 to use operation log 310 to generate one or more current parameter values based on property values stored in operation log 310. More specifically, parameter calculator 338 may traverse operation log 310 and read the log data key entries relevant to the storage parameter being calculated to generate an aggregate and/or iterative storage parameter value.

For example, parameter calculator 338 may be initiated to calculate a current parameter value for total storage capacity based on the "data" property in operation log 310. In some embodiments, parameter calculator 338 may start at a first entry of operation log 310, corresponding to the earliest timestamp or largest inverse timestamp, and sequentially read key data entries with the selected property identifier and their respective precondition and postcondition values. Parameter calculator 338 may start from a default parameter value, such as 0, or an initialization parameter value (such as a known parameter value at the time the log was initiated) and iteratively modify the parameter value using the precondition values and postcondition values. In some embodiments, parameter calculator 338 may include a prior parameter value associated with an index key value in operation log 310, such as an inverse timestamp at which the prior parameter value was calculated, and use both the prior parameter value and the index key value to begin its traversal. Similarly, parameter calculator 338 may stop at a defined index key value for a desired time for the parameter calculation, allowing historical parameter values to be calculated. For some storage parameter calculations, a value based on the property values is added or subtracted from the prior parameter value to iteratively calculate the new parameter value. However, more complex transfer functions between the property values and change to the parameter value are also possible.

In some embodiments, parameter calculator 338 may validate each log entry before modifying the parameter value based on the property change in the log entry. For example, parameter calculator 338 may compare the precondition value of the log entry being validated to the postcondition value of the prior log entry for the same object with the same property identifier, if any.

Parameter calculator 338 may include a delta calculator to calculate a delta value that represents the property change from the precondition value to the postcondition value. For example, the difference between the precondition value and the postcondition value may be calculated by subtracting the precondition value from the postcondition value.

Parameter calculator 338 may be initiated by one or more trigger conditions. For example, parameter calculator 338 may calculate and update storage parameters in real-time in response to a new key data entry with a relevant property being added to operation log 310. As another example, parameter calculator 338 may be initiated by receiving a parameter request message from another system, function, or user. Upon receiving the parameter request, parameter calculator 338 may initiate a storage parameter calculation by searching for relevant key data entries in operation log 310. As still another example, parameter calculator 338 may use one or more programmed intervals, such as elapsed time or a number of operations or log entries, to initiate a calculation. Other trigger conditions and trigger events may be possible and parameter calculator 338 may be configured to use different trigger conditions for different storage parameters, In some embodiments, a parameter reporter function may store and communicate storage parameters calculated by parameter calculator 338 to other storage system management functions that use those parameters to generate additional actions. For example, one or more storage management functions within storage application 224 may use storage parameters, such as total storage capacity, as inputs, thresholds, or outputs for generating storage allocation decisions, such as load balancing or directing new write requests to an alternate storage location. In some embodiments, the parameter reporter may publish, transmit, or store results in a network accessible parameter file for use by other systems, such as third-party application 222. For example, third-party application 222 may include storage management and/or billing applications that use total storage capacity to determine allocation of storage space and/or charges based on storage usage. In some embodiments, the parameter reporter may transmit storage parameters in a storage parameter message or data structure to other server systems, such as server system 220-1.

Progress service 350 may comprise logic executable to manage a number of storage management processes using operation log 310 in key data store 230. For instance, progress service 350 manages processes traversing operation log 310, schedules various processes, tracks the respective progress of these processes, manages dependencies and suspended processes, and compensates for timestamp differences across sharded operation logs. In some embodiments, an instance of progress service 350 operating in one storage application on a particular server or node and hosting a selected shard 232-1 . . . 232-N may manage or execute condition verifications against one or more other or prior shards from shards 232-1 . . . 232-N.

Progress service 350 may be coupled to key data store controller 320, and interact with key data store controller 320 to store and retrieve data from operation log 310 in key data store 230. Progress service 350 may be coupled to storage service 322 and/or property service 328 and interact with storage service 322 and/or property service 328 to coordinate storage management processes, such as garbage collection 324, replication 326, parameter calculator 338, and other storage management processes. In some embodiments, progress service 350 may include process scheduler 352, process tracker 354, process dependencies 356, and condition verifier 358. Progress service 350 may include other functions, such as maintaining a post-processing failure log and/or post-processing retry logic.

Process scheduler 352 may include one or more functions that allow progress service 350 to manage post-processing of operation log 310. More specifically, each storage management process that operates on operation log 310 may register with process scheduler 352 when initiating processing of operation log 310. For example, when garbage collection 324, replication 326, or parameter calculator 338 (e.g. capacity counting), are triggered, each may register with process scheduler 352 prior to commencing their respective searches or traverses of the key value entries in operation log 310. In some embodiments, process scheduler 352 may include active scheduling of log post-processing and manage schedules, elapsed times, trigger conditions, and/or priority queues for one or more post-processing storage management processes.

Process tracker 354 may include one or more functions that allow progress service 350 to track a plurality of storage operation processes. For example, each storage operation process that operates on operation log 310 may be assigned to a progress tracking data structure, such as a table or register, for tracking the progress position of that process based on timestamp values or progress timestamps, sometimes referred to as progress values. In some embodiments, process tracker 354 may maintain a process table with entries for each instance of a storage management process operating on operation log 310. Each storage management process may receive a process identifier and a progress value that identifies the current progress of the process in operation log 310 based on timestamps associated with the log entries. For example, process tracker 354 may include a table or list of timestamps 354-1 . . . N, where each timestamp and associated process identifier corresponds to the timestamp of the last log entry processed by each process.

For example, when the replication function batch process in replication 326 has processed the log entries up to the entry with a timestamp value of 90, the progress value for "replication_1" may be set to 90. When the capacity counting function batch process in parameter calculator 338 has processed the log entries up to the entry with a timestamp value of 80, the progress value for "capacitycount_2" may be set to 80. When the garbage collection function batch process in garbage collection 324 has processed the log entries up to timestamp 40, the progress value for "garbagecollection_3" may be set to 40. Additional instances of these processes may include the same process type with a different number to distinguish them from other instances. Each of these processes may be tracked using their respective progress values. The progress values may be derived from the most recent log entry that was processed and process tracker 354 may update the progress values in the process table as each entry is processed by their respective storage management processes.

In some embodiments, the progress value can be determined from the timestamp value in the log entry being processed without any additional processing or overhead for each transaction without effecting the performance of the metadata database for object storage 240. A query for the current progress of any given process may be returned with the progress value for tracking progress and the receiving function may use the progress value to determine which log entries have and have not been processed. For example, if the timestamp of a log entry for a data object is earlier than the progress value associated with the process, then the process has completed for this data object. If the timestamp of a log entry for a data object is later than the progress value associated with the process, then the process has not completed for this data object. This assumes that the log is being processed from oldest entries to newest entries. In some embodiments, a process may define the bounds of log entries being traversed and the direction of traversal and the progress value may be used to accurately determine the progress of the process, based on these other parameters.

Process dependencies 356 may include one or more functions that allow progress service 350 to monitor dependencies among a plurality of storage operation processes, such as prerequisite and dependent processes. The prerequisite process may be a process that needs to have completed processing of any given log entry prior to the dependent process processing the same log entry. Because different processes may have different initiation times, processing rates, and processing priorities, using progress tracking through process tracker 354 may enable process dependencies 356 to assure that no dependent process gets ahead of its prerequisite process or processes. In some embodiments, the process table may identify any prerequisite and dependent processes.

Process dependencies 356 may enable dependent storage management processes to be suspended when their progress value equals the progress value of their prerequisite processes and continue executing operations when their progress value is less than all prerequisite progress values. In some embodiments, process dependencies 356 may be able to monitor for these conditions and issue suspend and execute calls to the storage management processes. In some embodiments, the storage management processes may include a dependency check function that queries process dependencies 356 before each operation to verify that the dependency conditions are met.

For example, a capacity counting process or a garbage collection process may preferably not be run ahead of a replication process. The replication process should be allowed to complete processing for any given log entry ahead of these other processes. Replication may be considered a prerequisite process and capacity counting and garbage collection dependent processes. In some embodiments, a log cleanup log operation may be setup as a post-processing data management process to remove outdated log entries in a batch operation. Log cleanup should not proceed ahead of garbage collection, so garbage collection would be a prerequisite process to log cleanup. In some embodiments, each process may be defined in terms of being a data consumer and/or a metadata consumer to determine which other processes it is dependent on. Metadata consumer should not proceed ahead of metadata processors and data consumers should not proceed ahead of data processors.

Condition verifier 358 may include one or more functions that allow progress service 350 to verify conditions related to possible dependencies, such as dependencies created by sharding operations, such as migration of log entries between shards. For example, progress service 350 may be configured to correct for timestamps and operations that may not be synchronized across different shards, typically hosted by different storage systems, by verifying conditions based on the original shard identifier and original shard timestamp. As described above, each post-processing storage management process may use progress values based on operation log timestamps for tracking progress and dependencies. In a sharded DSS where operations log 310 and/or a metadata database in key data store 230 are divided among multiple systems, it may be advantageous to verify for local differences in generated timestamp values.

As described above with regard to FIGS. 1D and 1F, each log entry may include a shard identifier that corresponds to the current shard of the log entry and an original shard identifier that corresponds to the birth shard, the birth shard corresponding to the computer system that initially generated the log entry. The original shard identifier may enable condition verifier 358 to determine the birth shard and determine the host storage system and progress values for storage management processes on the birth shard. For example, process tracker 354 (or a corresponding function of a progress service on the system hosting the birth shard) may be accessible to each computer system and enable a query to determine one or more relevant progress values that could create prerequisite conditions for a storage management process managed by progress service 350. Condition verifier 358 may query process tracker 354 using the original shard identifier (or corresponding process identifier) and use the original shard timestamp to verify that a prerequisite process or processes have passed the original timestamp value. For example, a current progress value for the original shard may be compared to the original timestamp value and the verification may only be successful if the progress value exceeds the original timestamp value.

The methods of FIGS. 4-7 are now described. With reference to these methods, each of the operations shown and/or described may correspond to instructions stored in a computer memory or computer-readable storage medium, a customized logic chip, or other suitable implementation as discussed elsewhere herein. For example, the methods of FIGS. 4-6 may be implemented in a distributed storage system, such as DSS 200 in FIG. 2, using a computer system, such as computing system 300 in FIG. 3, with a storage application, such as storage application 224, executing the various methods as functions or operations within the storage application.

Figure 4:
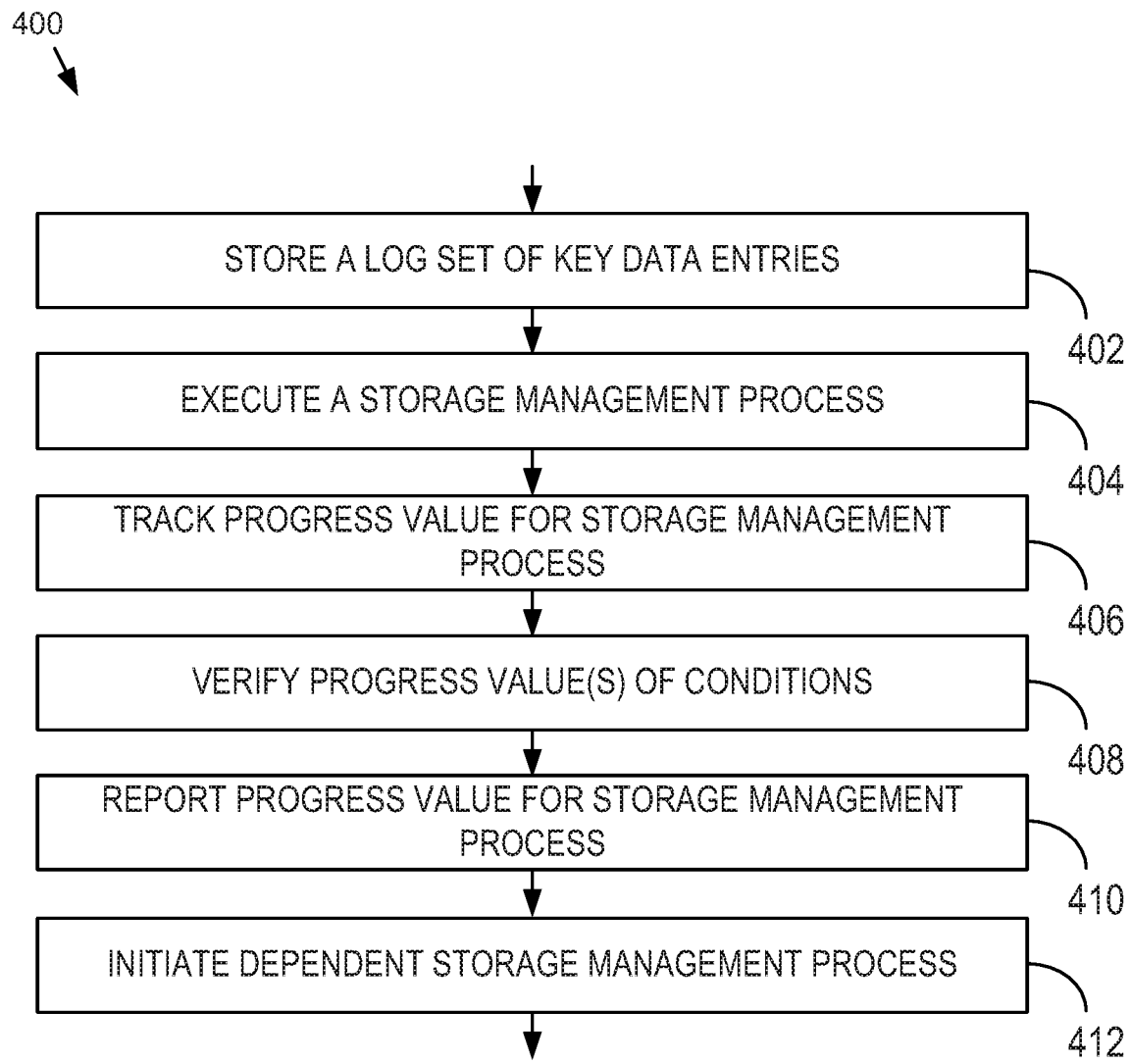
FIG. 4 is a flow chart of an example method for managing a storage management process using progress values.

FIG. 4 is a flow chart of an example method 400 for managing a storage management process using progress values. For example, storage application 224 may use progress service 350 to track progress values for a storage management process that post-processes operation log 310.

At block 402, a computer system may store a log set of key data entries in a key data store. For example, as the computer system processes or receives notification of storage operations that impact data property values for one or more data objects, the computer system may write log entries into a key value-based log, where one or more log entries related to one or more properties comprise a set. Each key data entry in the log set may include a key value corresponding to the storage operation that it was generated in response to. For example, each key data entry may include a data object identifier for the data object that was the target of the storage operation, an inverse timestamp that corresponds to the time at which the storage operation was executed, and an operation identifier that identifies the type of storage operation it was, such as a write, read, delete, or other storage operation. Each key data entry may also include at least one precondition value and at least one postcondition value describing a property that may change because of the storage operation. For example, data object size may be changed by a write, read/modify/write, delete, or other operation and the precondition value may be the object size before the operation and the postcondition value may be the object size after the operation. The key data entry may also include a timestamp based on the time at which an originating computer system executed the storage operation and/or logged the key data entry.

At block 404, the computer system may execute a storage management process on the set of key data entries. For example, a storage management process may traverse the set of key data entries and perform one or more operations related to a metadata store, related data objects, and/or the operation log itself. The storage management process may read a key value and/or one or more data instances and selectively execute operations based on process criteria.

At block 406, the computer system may track progress of the storage management process using a progress value. For example, each time the storage management process completes its read of a log entry and any related selective operations, the timestamp for the log entry may be stored as an updated progress value. In some embodiments, the progress value may be stored in a process table or other location for use by the storage management process or other functions. As each subsequent log entry is processed, the progress value will be updated to reflect the timestamp of the most recently completed log entry and thereby track the progress of the storage management process.

At block 408, the computer system may verify one or more conditions for continued processing based on progress values. For example, the storage management process may be contingent on the progress of another storage management process and the progress value of the other storage management process may be checked against the progress value of the present storage management process to determine whether it can continue. In some embodiments, the computer system may use one or more key entry values or related metadata to determine the other storage management process, such as a process running on an original shard for the key entry, and the progress value that needs to be met, such as exceeding the original shard timestamp of the key entry.

At block 410, the computer system may report the progress value for the storage management process. For example, the progress value may be stored to a register of progress values or a process table utilized by multiple storage applications or sent as a message, parameter value, or call to another function in the computer system for display or responsive processing. In some embodiments, the progress value may be reported to the storage management process or another function that initiated the storage management process.

At block 412, the computer system may initiate a dependent storage management process based on the progress value for the prerequisite storage management process exceeding the progress value of the dependent storage management process. For example, a dependent storage management process may be suspended or waiting for the storage management process described in blocks 402-410 to get ahead of the dependent storage management process before operating on the next log entry. When the progress value of the prerequisite storage management process exceeds the progress value of the dependent storage management process, the computer system may resume and execute the next operation for the dependent storage management process.

Figure 5:
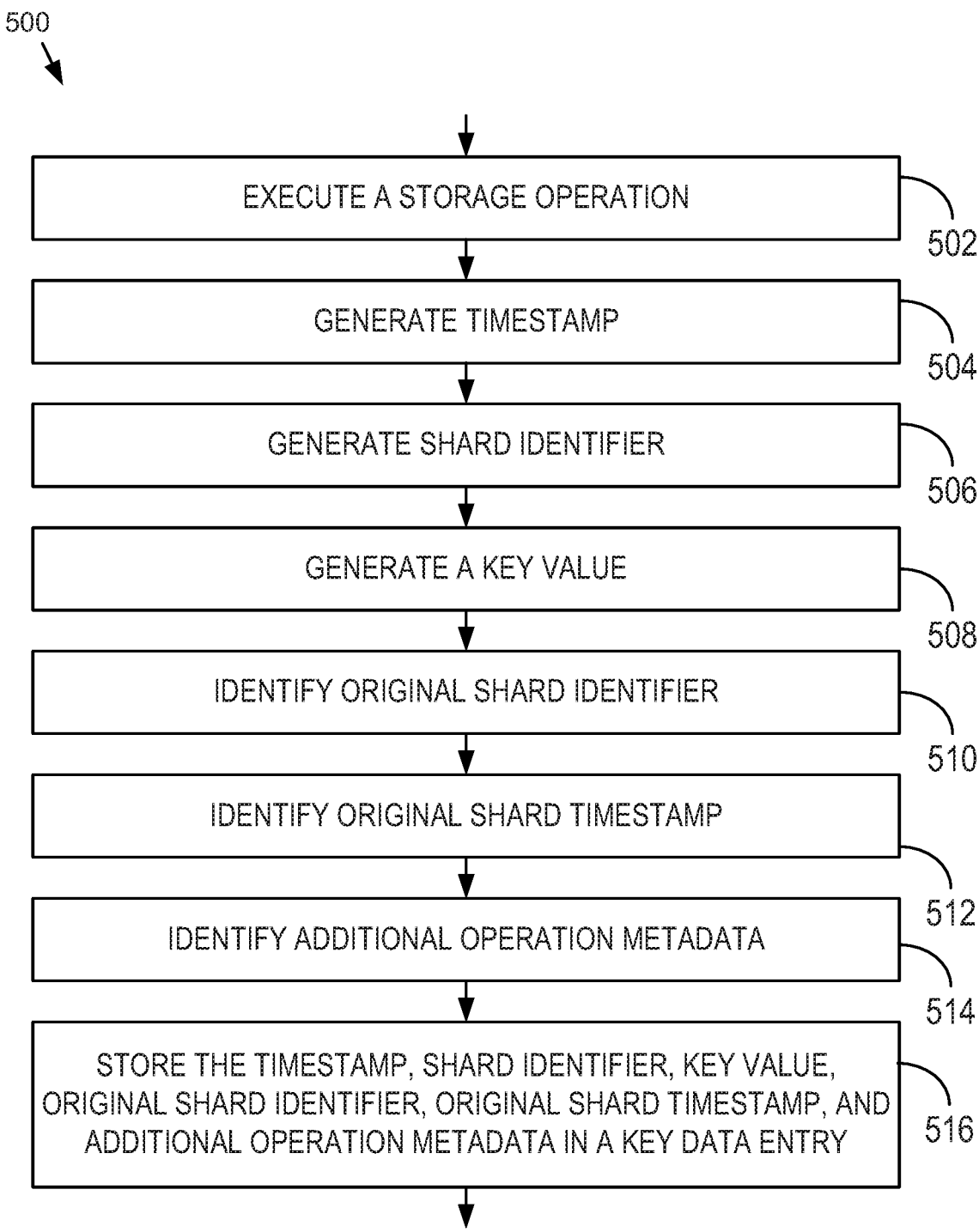
FIG. 5 is a flowchart of an example method for storing timestamps in a sharded key data store for storage operation properties.

FIG. 5 is a flowchart of an example method 500 for storing timestamps in a sharded key data store for storage operation properties. For example, storage application 224 may use progress service 350 to generate a key data entry including property log information for operation log 310 in the key data store.

At block 502, the computer system may execute a storage operation. For example, a computer system in a distributed storage system may execute an object storage operation to write, delete, read, or otherwise manipulate a data object in the storage system. The storage operation may include any operation that creates, modifies, or removes a data element and/or related metadata in the distributed storage system. In addition to the primary effect of the storage operation on the stored data (or its retrieval or management), the storage operation may also impact one or more related properties, sometimes referred to as operation properties. For example, a write operation may allocate storage space to a data object, utilize processing, metadata, or other resources, relate to user, bucket, or system allocations, or have other system impacts that may be defined as properties of the operation. It may be beneficial to log one or more of these properties for calculating storage system parameters and/or managing the distributed storage system.

At block 504, the computer system may generate a timestamp for the storage operation. For example, the timestamp may be based on a clock time of the computer system or as otherwise described above with regard to timestamps for the calculation of inverse timestamps.

At block 506, the computer system may generate a shard identifier. For example, in a sharded operation log, the computer system may include a shard identifier as part of shard management and/or generate a shard identifier based on one or more unique identifiers for the computer system.

At block 508, the computer system may generate a key value. For example, the key value may be related to the storage operation and provide an index value for describing that operation. In some embodiments, the key value may include a data object identifier, an inverse timestamp, and an operation identifier, as further described above.

At block 510, the computer system may identify an original shard identifier. For example, the shard identifier corresponding to where the log entry was initially generated, which may include the present shard, and to the original storage operation may be identified by the computer system. If the log entry has been transferred, such as through shard migration or replication, the original shard identifier may be included in the metadata from the prior version of the log entry in the prior shard and persisted in the new log entry.

At block 512, the computer system may identify an original shard timestamp corresponding to the original shard identifier and storage operation. For example, the shard timestamp associated with the original creation of the log entry in response to the original storage operation may be determined from the present timestamp (if it is the original log entry) or may be determined from the prior version of the log entry as described above for the original shard identifier.

At block 514, the computer system may identify additional storage operation metadata, such as storage operation properties. For example, a storage operation may generate or modify a data object with a data object size. Other storage operation properties may include metadata usage, operation counts, error/retry counts, resource usage (memory, processor, buffer, etc.), etc. In some embodiments, multiple operation properties may be defined and associated with each storage operation. A property identifier may be associated with each operation property and may be used to identify values associated with that property. In some embodiments, each operation property may include precondition and postcondition values. The precondition and postcondition values may relate to the same property and assign a value to the property before the storage operation (precondition) and after the storage operation (postcondition).

At block 516, the computer system stores the timestamp, shard identifier, key value, original shard identifier, original shard timestamp, and any additional operation metadata in a key data entry for the operation or property log. For example, the key value may be stored as the index for the key data entry in the operation log and the precondition value and postcondition value may be stored in the associated data instance. The computer system may also include property identifiers for identifying the storage operation property associated with the key data entry. In some embodiments, the property identifier may be associated with each of the precondition and postcondition values and the key data entry may include multiple properties designated by multiple property identifiers (each paired with precondition and postcondition values). In some embodiments, the log may be used for a single property and not use a property identifier and/or the property identifier may be associated with the key value rather than the data instance.

Figure 6:
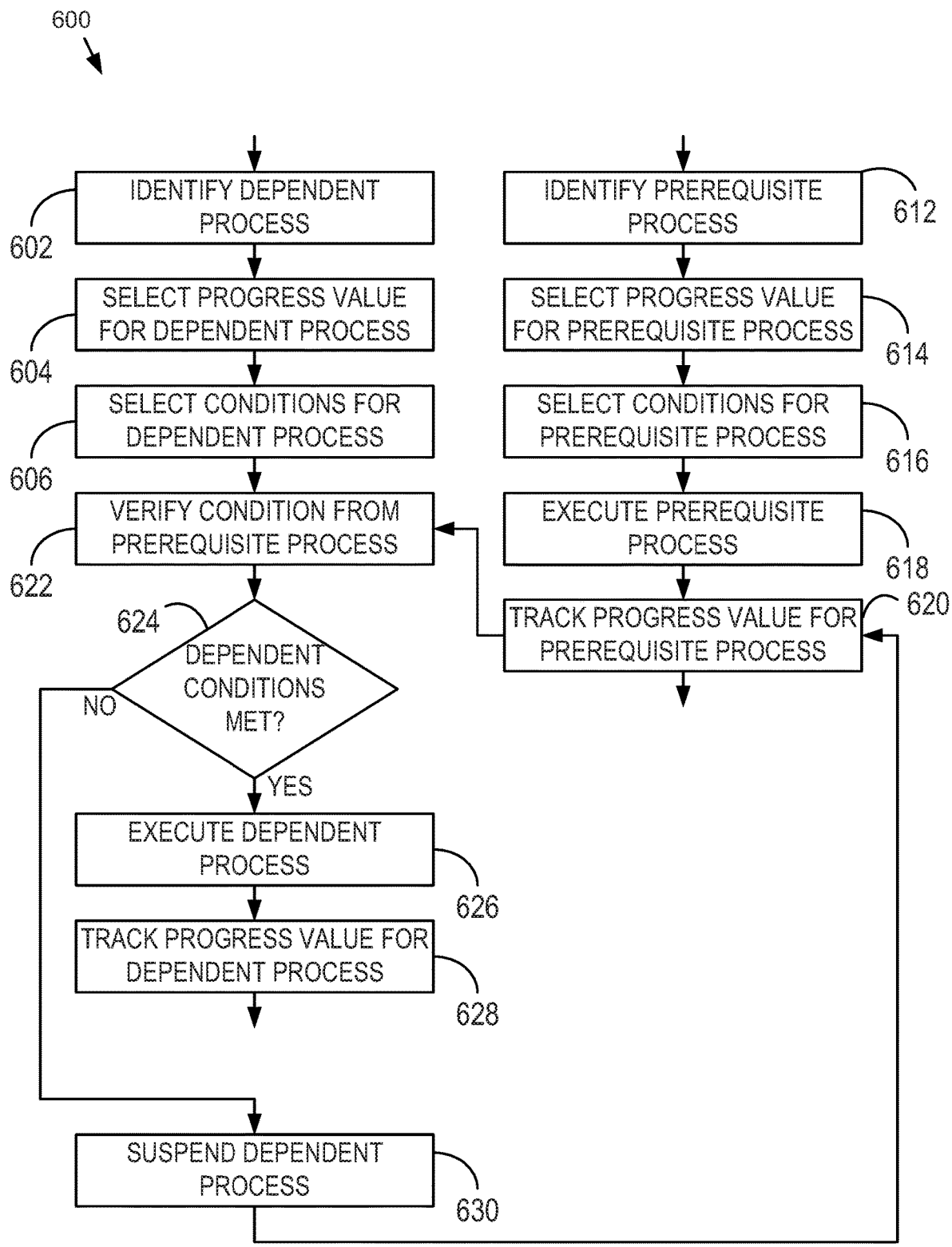
FIG. 6 is a flowchart of an example method for managing dependent and prerequisite storage management processes operating on a key data store.

FIG. 6 is a flowchart of an example method 600 for managing dependent and prerequisite storage management processes operating on a key data store. For example, storage application 224 may use progress service 350 to manage dependencies in operation log 310 in the key data store.

At block 602, the computer system may identify a dependent storage management process. For example, garbage collection may be a dependent process that should allow one or more other processes, such as a replication process, to complete. At block 612, the computer identifies at least one prerequisite process to be operate on log entries ahead of the dependent process.

At block 604, the computer system may select a progress value for tracking the dependent process. For example, the computer may select the progress values based on timestamp as described above. At block 614, the computer system may select a comparable progress value for tracking the prerequisite process. For example, the same method of progress value calculation may be used for the prerequisite process.

At block 606, the computer system may select conditions for the dependent process to execute. For example, garbage collection may have a condition that replication must have completed for each log entry prior to performing garbage collection on that entry. At block 616, a prerequisite process may itself be a dependent process or have other conditions, such as priority, completion of another system task, or a dependency from another function in the storage application and the computer may select conditions for the prerequisite process. For the purposes of this example, it is assumed that the prerequisite process conditions are met.

At block 618, the computer system may execute the prerequisite process and, at block 620, track the progress value for the prerequisite process as it executes against each log entry. For example, replication may traverse and execute against the operation log.

At block 622, the computer system may verify one or more conditions for executing the dependent process. For example, the progress value of the garbage collection process may be compared to the progress value of the replication process. At block 624, if the dependent conditions are met, method 600 may proceed to block 626. If the dependent conditions are not met, method 600 may proceed to block 630.

At block 626, the computer system may execute the dependent process. For example, garbage collection may traverse and execute against log entries that have already been processed by the prerequisite replication process. At block 628, the computer system may track the selected progress value for the dependent process. For example, the progress value of the dependent process may be updated as described above and used at block 622 to verify the condition from the prerequisite process.

At block 630, the computer system may suspend the dependent process to wait for the prerequisite process to meet the dependent process condition. For example, whenever garbage collection catches up with replication, garbage collection may be suspended until replication gets ahead again, and may then be resumed.

Figure 7:
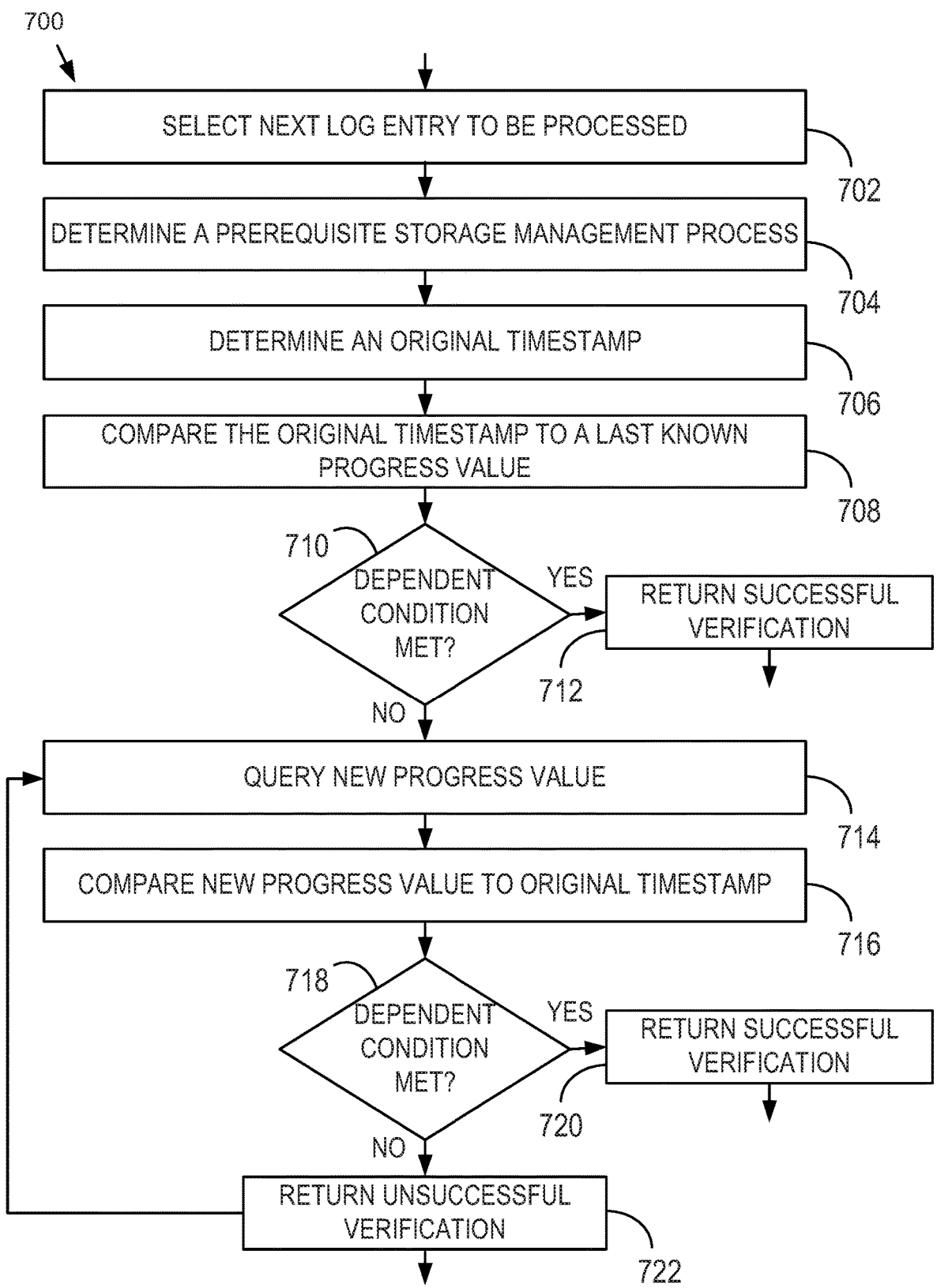
FIG. 7 is a flowchart of an example method for verifying conditions in a sharded key data store.

FIG. 7 is a flowchart of an example method 700 for verification of prerequisite storage management processes operating on a key data store. For example, storage application 224 may use progress service 350 to manage dependencies and verifications in operation log 310 in the key data store.

In some embodiments, the progress service 350 may periodically attempt to verify one or more conditions of the executed storage management processes (e.g., at least one condition of a first storage management process, a second storage management process, etc., that overlap to some degree, are executing in parallel at least in part, etc.).

At block 702, the computer system may select a next log entry to be processed. For example, a capacity counting process may select the next log entry in timestamp order to evaluate capacity changes and add them to one or more capacity values.

At block 704, the computer system may determine a prerequisite storage management process. For example, garbage collection may be a dependent process that should allow one or more other prerequisite processes, such as a replication process, to complete. In some embodiments, the prerequisite process may be operating on another log set of key values, such as the log set of another shard of a sharded operations log. The original shard identifier in the log entry selected at block 702 may be used to identify the prerequisite storage management process on the original shard.

At block 706, the computer system may determine an original timestamp for the original log entry in the original shard. For example, the original time stamp may be included in the key or data parameters of the selected key entry.

At block 708, the computer system may compare the original timestamp value to a last known progress value for the prerequisite process. For example, on a prior iteration through method 700 for a prior log entry, a progress value for the prerequisite process may have been queried and stored. The computer system may first check against that stored value to see whether the timestamp of the next log entry is still below (before) the stored progress value for the prerequisite process.

At block 710, the computer system may evaluate the dependent condition based on the comparison at block 708. If the next log entry is still before the stored progress value, the condition is met and successful verification may be returned at block 712. If the next log entry is after the stored progress value, the verification condition is not yet met and method 700 an unsuccessful verification may be returned and/or method 700 may continue to block 714.

At block 714, a new progress value may be queried for the prerequisite storage management process. For example, the computer system may maintain or have access to a series of timestamp vectors maintained by the various storage management processes in a progress services, such as progress service 350. The computer system may query the progress service for the current progress value based on the most recently processed timestamp of the prerequisite storage management process and the progress service may return the current progress value.

At block 716, the computer system may compare the original timestamp value to the new progress value for the prerequisite process. At block 718, the computer system may evaluate the dependent condition based on the comparison at block 716. If the next log entry is before the new progress value, the condition is met and successful verification may be returned at block 720. If the next log entry is after the new progress value, the verification condition is not yet met and unsuccessful verification may be returned at block 720. In some embodiments, the return of an unsuccessful verification may trigger a suspend and retry cycle, similar to method 600 in FIG. 6. Method 700 may periodically return to block 714 to query a new progress value until the dependent condition is met at block 718 and successful verification may be returned. This loop may include safeguards, such as a timeout function, to prevent endless looping or an unacceptable use of computing resources.

To ease understanding, some elements (e.g., requests, identifiers, timestamps, operations, etc.), may be referred to in the description and/or the claims using the labels first, second, third, etc. These labels are intended in some cases to help to distinguish the elements, but do not necessarily imply any particular order or ranking unless indicated otherwise.

Referring again to FIG. 3, in some embodiments, the key data store controller 320 may determine that the number of object keys stored in the ordered set of object key entries exceeds a predetermined threshold. The threshold may reflect the amount of storage space that can be acceptably utilized (e.g., a percentage of utilized storage space relative to a maximum). Responsive to such a determination, the key data store controller 320 may add an additional shard, in which case the key data store controller 320 may redistribute the object keys between the shards to help ensure that the object keys are more evenly spread between the database shards. In some cases, the key data store controller 320 may update a range table to accurately represent which object keys are stored on which database shards. In further embodiments, the key data store controller 320 may create new shards or re-shard the existing database shards for additional reasons including, but not limited to, improve performance of key data store 230, compliance to rules/laws/regulations, security policies, and/or load requirements of the key data store 230, and/or other suitable purposes.

The processor(s) 302 may execute software instructions by performing various input/output, logical, and/or mathematical operations. The processor(s) 302 may have various computing architectures to process data signals including, for example, a complex instruction set computer (CISC) architecture, a reduced instruction set computer (RISC) architecture, and/or an architecture implementing a combination of instruction sets. The processor(s) 302 may be physical and/or virtual, and may include a single processing unit and/or core or plurality of processing units and/or cores. In some implementations, the processor(s) 302 may be capable of generating and providing electronic display signals to a display device (not shown), supporting the display of images, capturing and transmitting images, performing complex tasks including various types of feature extraction and sampling, etc. In some embodiments, the processor(s) 302 may be coupled to the memor(ies) 304 via a communication bus 306 to access data and instructions therefrom and store data therein. The bus 306 may couple the processor(s) to the other components of the computing system 300, for example, memor(ies) 304, communication unit(s) 308, physical storage devices and/or storage systems (e.g., object storage 240, key data store 230).

The memor(ies) 304 may store and provide access to data to the other components of the computing system 300. The memor(ies) 304 may store instructions and/or data that may be executed by the processor(s) 302. For example, the memor(ies) 304 may store an instance of the storage application 224, software implementing the key data store 230, cached keys and objects, parameters, operating system(s), drivers, databases, and/or other software applications, etc. The memor(ies) 304 may be coupled to the bus 306 for communication with the processor(s) 302 and the other components of computing system 300.

The memor(ies) 304 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor(s) 302. In some embodiments, the memor(ies) 304 may include one or more of volatile memory and non-volatile memory (e.g., random access memory (RAM), read-only memory (ROM), flash, solid state drive, hard drive, optical disc, tape, magnetic diskette, etc.). It should be understood that the memor(ies) 304 may include a single device or may include multiple types of devices and configurations.

The communication unit 308 may include one or more interface devices for wired and wireless communication with the network 210 and the other entities and/or components of the system 200 including, for example, the client systems 202, server systems 220, object storage 240, etc. For instance, the communication unit 308 may include, but is not limited to, category (CAT)-type interfaces; wireless transceivers for sending and receiving signals using Wi-Fi™; Bluetooth®, cellular communications, etc.; universal serial bus (USB) interfaces; various combinations thereof; etc. In some embodiments, the communication unit 308 can link the processor(s) 302 to the network 210, which may in turn be coupled to other processing systems. The communication unit 308 can provide other connections to the network 210 and to other entities of the system 300 using various communication protocols, including, for example, those discussed elsewhere, herein. In some instances, the communication unit 308 includes a wired port and a wireless transceiver. The communication unit 308 also provides other connections to the network 210 for distribution of files and/or media objects using various network protocols, such as those discussed elsewhere herein.

In some embodiments, the computing system 300 may include a software communication mechanism implemented via the network 210 and/or communication bus 306 that can include and/or facilitate, for example, inter-method communication, local function or procedure calls, remote procedure calls, an object broker (e.g., common object request broker architecture (CORBA)), direct socket communication (e.g., TCP/IP sockets) among software modules, UDP broadcasts and receipts, HTTP connections, etc. Further, any or all of the communication could be secure (e.g., secure shell (SSH), HTTPS, etc.).

In the above description, for purposes of explanation, numerous specific details are set forth to provide a thorough understanding of the various aspects of different example embodiments. It should be evident, however, that any particular example embodiment may in various cases be practiced without all of the specific details and/or with variations, permutations, and combinations of the various features and elements described herein.

Throughout this specification, plural instances may implement components, operations, or structures described as a single instance. Although individual operations of one or more methods are illustrated and described as separate operations, one or more of the individual operations and/or process may be performed concurrently and/or overlap, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

It should also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. It should also be understood that the term "and/or" as used herein refers to and encompasses any and/or all possible combinations of one or more of the associated listed items. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A storage system, comprising:
at least one storage node configured to execute storage operations;
a key data store configured to store a log including a set of key data entries, wherein each key data entry of the set of key data entries includes:
 a key value corresponding to at least one storage operation; and
 a timestamp corresponding to a creation time of the key data entry;
at least one memory;
at least one processor; and
a storage application executable by the at least one processor using the at least one memory to perform operations comprising:
 executing a first storage management process on a plurality of key data entries from the set of key data entries in the key data store;
 tracking, using timestamps of key data entries forming the plurality of key data entries, a first progress value for the first storage management process; and
 verifying, using a second progress value for a second storage management process, at least one condition for the first storage management process, wherein:
  the plurality of key data entries is configured in a timestamp order;
  the first storage management process traverses the plurality of key data entries in the timestamp order;
  the first progress value is configured to be a most recently processed key data entry for the first storage management process;
  the second storage management process traverses the plurality of key data entries in the timestamp order;
  the second progress value is configured to be a most recently processed key data entry for the second storage management process; and
  completion of the first storage management process is based on a verification of the at least one condition for the first storage management process.

2. The storage system of claim 1, wherein:
the key data store is sharded across a plurality of databases;
each key data entry of the set of key data entries further includes an original shard identifier;
the first storage management process is configured to operate on a first shard;
the second storage management process is configured to operate on a second shard; and
the operations further comprise:
 determining, based on the original shard identifier in at least one key data entry associated with the first storage management process, the second storage management process; and
 querying, responsive to determining the second storage management process, for the second progress value.

3. The storage system of claim 2, wherein:
each key data entry of the set of key data entries further includes an original shard timestamp; and
the at least one condition includes a comparison between the original shard timestamp to the second progress value.

4. The storage system of claim 1, wherein:
the at least one condition requires the second progress value to exceed the first progress value; and
the operations further comprise:
suspending, responsive to the verification of the at least one condition for the first storage management process being unsuccessful, the first storage management process;
periodically attempting to verify the at least one condition of the first storage management process; and
resuming, responsive to the verification of the at least one condition for the first storage management process being successful, the first storage management process.

5. The storage system of claim 1, wherein the operations further comprise:
executing the second storage management process, wherein:
the first storage management process overlaps the second storage management process; and
the at least one condition for the first storage management process is dependent on a progress state of the second storage management process; and
tracking, using the timestamps of the key data entries, the second progress value for the second storage management process.

6. The storage system of claim 5, wherein verifying the at least one condition includes:
comparing the first progress value to the second progress value;
determining, responsive to the second progress value exceeding the first progress value, the progress state to be met;
returning, responsive to the progress state being met, a successful verification condition; and
returning, responsive to the progress state not being met, an unsuccessful verification condition.

7. The storage system of claim 1, wherein:
the first progress value corresponds to the timestamp of a most recently processed key data entry associated with the first storage management process; and
the second progress value corresponds to the timestamp of a most recently processed key data entry associated with the second storage management process.

8. The storage system of claim 1, wherein the first storage management process is one of:
calculating a storage property;
replicating data objects; and
garbage collection.

9. The storage system of claim 1, wherein:
each key data entry of the set of key data entries further comprises at least one property value including:
at least one precondition value; and
at least one postcondition value; and
the first storage management process calculates, based on the at least one precondition value and the at least one postcondition value, a storage property.

10. A computer-implemented method, comprising:
providing a key data store comprising a log including a set of key data entries, wherein each key data entry of the set of key data entries includes:
a key value corresponding to at least one storage operation; and
a timestamp corresponding to a creation time of the key data entry;
executing a first storage management process on a plurality of key data entries from the set of key data entries in the key data store;
tracking, using timestamps of key data entries forming the plurality of key data entries, a first progress value for the first storage management process; and
verifying, using a second progress value for a second storage management process, at least one condition for the first storage management process, wherein:
the plurality of key data entries is configured in a timestamp order;
the first storage management process traverses the plurality of key data entries in the timestamp order;
the first progress value is configured to be a most recently processed key data entry for the first storage management process;
the second storage management process traverses the plurality of key data entries in the timestamp order;
the second progress value is configured to be a most recently processed key data entry for the second storage management process; and
completion of the first storage management process is based on a verification of the at least one condition for the first storage management process.

11. The computer-implemented method of claim 10, wherein:
the key data store is sharded across a plurality of databases;
each key data entry of the set of key data entries further includes an original shard identifier;
the first storage management process is configured to operate on a first shard; and
the second storage management process is configured to operate on a second shard; and
further comprising:
determining, based on the original shard identifier in at least one key data entry associated with the first storage management process, the second storage management process; and
querying, responsive to determining the second storage management process, for the second progress value.

12. The computer-implemented method of claim 11, wherein:
each key data entry of the set of key data entries further includes an original shard timestamp; and
the at least one condition includes a comparison between the original shard timestamp to the second progress value.

13. The computer-implemented method of claim 10, wherein the at least one condition requires the second progress value to exceed the first progress value and further comprising:
suspending, responsive to the verification of the at least one condition for the first storage management process being unsuccessful, the first storage management process;
periodically attempting to verify the at least one condition of the first storage management process; and
resuming, responsive to the verification of the at least one condition for the first storage management process being successful, the first storage management process.

14. The computer-implemented method of claim 10, further comprising:
executing the second storage management process, wherein:
the first storage management process overlaps the second storage management process; and
the at least one condition for the first storage management process is dependent on a progress state of the second storage management process; and
tracking, using the timestamps of the key data entries, the second progress value for the second storage management process.

15. The computer-implemented method of claim 14, wherein verifying the at least one condition includes:
comparing the first progress value to the second progress value;
determining, responsive to the second progress value exceeding the first progress value, the progress state to be met;
returning, responsive to the progress state being met, a successful verification condition; and
returning, responsive to the progress state not being met, an unsuccessful verification condition.

16. The computer-implemented method of claim 10, wherein:
the first progress value corresponds to the timestamp of a most recently processed key data entry associated with the first storage management process; and
the second progress value corresponds to the timestamp of a most recently processed key data entry associated with the second storage management process.

17. The computer-implemented method of claim 10, wherein the first storage management process is one of:
calculating a storage property;
replicating data objects; and
garbage collection.

18. The computer-implemented method of claim 10, wherein:
each key data entry of the set of key data entries further comprises at least one property value including:
at least one precondition value; and
at least one postcondition value; and
the first storage management process calculates, based on the at least one precondition value and the at least one postcondition value, a storage property.

19. A system, comprising:
at least one storage node configured to execute storage operations;
a key data store configured to store a log including a set of key data entries, wherein each key data entry of the set of key data entries includes:
a key value corresponding to at least one storage operation; and
a timestamp corresponding to a creation time of the key data entry;
means for executing a first storage management process on a plurality of key data entries from the set of key data entries in the key data store;
means for tracking, using timestamps of key data entries forming the plurality of key data entries, a first progress value for the first storage management process; and
means for verifying, using a second progress value for a second storage management process, at least one condition for the first storage management process, wherein:
the plurality of key data entries is configured in a timestamp order;
the first storage management process traverses the plurality of key data entries in the timestamp order;
the first progress value is configured to be a most recently processed key data entry for the first storage management process;
the second storage management process traverses the plurality of key data entries in the timestamp order;
the second progress value is configured to be a most recently processed key data entry for the second storage management process; and
completion of the first storage management process is based on a verification of the at least one condition for the first storage management process.

20. The system of claim 19, wherein:
the key data store is sharded across a plurality of databases;
each key data entry of the set of key data entries further includes an original shard identifier;
the first storage management process is configured to operate on a first shard; and
the second storage management process is configured to operate on a second shard; and
further comprising:
means for determining, based on the original shard identifier in at least one key data entry associated with the first storage management process, the second storage management process; and
means for querying, responsive to determining the second storage management process, for the second progress value.

* * * * *